United States Patent [19]
Sekiya et al.

[11] Patent Number: 5,665,468
[45] Date of Patent: Sep. 9, 1997

[54] MAGNETO-OPTICAL RECORDING MEDIUM

[75] Inventors: Masahiko Sekiya; Tohru Horiguchi, both of Hino; Kiyoshi Chiba, Chofu, all of Japan

[73] Assignee: Teijin Limited, Osaka, Japan

[21] Appl. No.: 269,680

[22] Filed: Jul. 1, 1994

[30] Foreign Application Priority Data

| Jul. 2, 1993 | [JP] | Japan | 5-164536 |
| Oct. 15, 1993 | [JP] | Japan | 5-258266 |
| Nov. 16, 1993 | [JP] | Japan | 5-286755 |

[51] Int. Cl.$^6$ .............. G11B 5/66; B32B 5/16
[52] U.S. Cl. .......... 428/332; 428/336; 428/669; 428/678; 428/672; 428/673; 428/675; 428/694 EC; 428/694 MM; 428/694 SC; 428/694 LE; 428/694 DE; 428/694 NF; 428/694 RE; 428/694 RL; 428/900; 369/13
[58] Field of Search .......... 428/694 EC, 694 MM, 428/694 SC, 694 LE, 694 DE, 694 NF, 694 RE, 694 RL, 900, 332, 336, 669, 672, 673, 675, 678; 369/13

[56] References Cited

U.S. PATENT DOCUMENTS

| 4,801,499 | 1/1989 | Aoyama et al. | 428/336 |
| 5,089,358 | 2/1992 | Takr et al. | 428/694 DE |

FOREIGN PATENT DOCUMENTS

| 63-241739 | 10/1988 | Japan. |
| 1251357 | 10/1989 | Japan. |
| 2247846 | 10/1990 | Japan. |
| 4370550 | 12/1992 | Japan. |
| 5120745 | 5/1993 | Japan. |
| 5182264 | 7/1993 | Japan. |

OTHER PUBLICATIONS

The Dependence of Direct Overwrite Characteristics . . . , and The Magnetization Process in RE–TM Alloys Studied Using The Extra. Hall Effect (Abstracts), J. Appl. Phys. vol. 69, No. 8 (1991) 4967.
Performance of Magneto–optical Recording Media with Direct Overwrite Capability, J. Appl. Phys. vol. 63, No. 8 (1988) 3844.
Operating Margins for Magneto–Optic Recording Materials with Direct Overwrite Capability, IEEE Trans. Magn. vol. 23, No. 1 (1987) 171.
Magneto–optic Recording Materials with Direct Overwrite Capability, Appl. Phys, Lett. vol. 49, No. 8 (1986) 473.
The Erase Process in Direct Overwrite Magneto–optic Recording, IEEE Tran. Magn. vol. 25, No. 5 (1989) 3530.
Gambino et al. "Exchange Coupled CoPd/TbCo Mo–Storage Films–IEEE Trans. Magnetics", vol. 25, No. 5; Sep. 1989, pp. 3749–3751.

Primary Examiner—Leszek Kiliman
Attorney, Agent, or Firm—Sughrue, Mion, Zinn, Macpeak & Seas

[57] ABSTRACT

A magneto-optical recording medium in which direct overwriting can be done by only modifying the power level and/or the pulse width of applied optical pulses, and without changing the direction of the bias magnetic field. The recording layer comprises first and second magnetic recording layers. The first magnetic layer is a rare-earth transition metal-amorphous alloy and has a perpendicular easy magnetization axis, a thickness of 10 to 200 nm, and a compensation temperature above room temperature. The second magnetic layer comprises an alloy of a first component of Co and/or Fe and a second component of a rare earth metal and/or a noble metal or an alloy of Co and at least one metal selected from Ti, Cr, Mn, Cu, Zn, Ga and Ge. The second magnetic layer is a material having an in-plane easy magnetization axis such that it has a magnetization axis parallel to the second magnetic layer if formed independently on a dielectric layer, the second magnetic layer having a thickness of not more than 3 nm.

23 Claims, 8 Drawing Sheets

PERPENDICULAR

IN-PLANE

Fig.10

| METAL REFLECTING LAYER | | λd (μW/K) | | | | | | | |
|---|---|---|---|---|---|---|---|---|---|
| | | 1.25 | 2.5 | 4 | 7.5 | 10.5 | 13 | 16.3 | 18 |
| | | AlAuTi THICKNESS (nm) | | | | | AgAuTi THICKNESS (nm) | | |
| | | 62.5 | 120 | 200 | 375 | 210 | 260 | 326 | 360 |
| COMPOSITION | FIRST MAGENTIC LAYER | | | | | | | | |
| Tcw (°C) | | | | | | | | | |
| 240 | GdTbFeCo 6:20:66:8 | Ref.ex.1 37/9.5 | Ref.ex.2 39/10.0 | Ref.ex.3 39/10.0 | Ref.ex.4 37/10.5 | Ref.ex.5 35/11.0 | | | |
| 180 | GdTbFeCo 6:20:71:3 | Ref.ex.6 39/8.5 | Ex.1 40/8.5 | Ex.2 41/9.0 | Ex.3 42/9.5 | Ex.4 41/10.0 | Ref.ex.7 39/10.5 | | |
| 150 | GdTbFeCo 6:20:73:1 | Ref.ex.8 39/8.0 | Ex.5 40/8.0 | Ex.6 41/8.5 | Ex.7 42/9.0 | Ex.8 42/9.5 | Ex.9 41/10.0 | Ref.ex.9 39/10.5 | |
| 120 | GdTbFe 6:20:74 | Ref.ex.10 38/7.5 | Ex.10 40/7.5 | Ex.11 40/8.0 | Ex.12 40/8.5 | Ex.13 41/9.0 | Ex.14 40/9.5 | Ex.15 40/10.0 | Ref.ex.11 39/10.5 |
| 80 | TbFe 26:74 | | | | Ref.ex.12 36/8.0 | | | | |

UPPER LINE: SAMPLE INDICATION
LOWER LINE: C/N(dB)/PH(mw)

MAGNETO-OPTICAL RECORDING MEDIUM

BACKGROUND OF THE INVENTION

1. Field of the Invention

The present invention relates to a magneto-optical recording medium for recording and reproducing information and which can be rewritten, more specifically a magneto-optical recording medium in which direct overwriting can be done by modifying the power level and/or pulse width of applying laser pulses, without changing the direction and intensity of a bias magnetic field.

2. Description of Related Art

Magneto-optical recording media have been widely investigated and developed as high density and high capacity information recording media. Particularly, rewritable magneto-optical recording media can be used in various fields and, therefore, various materials and systems have been proposed therefor and thus rewritable magneto-optical recording media have already made into use.

When compared with recording media such as floppy discs and hard discs, magneto-optical recording media have a drawback in that overwriting is difficult. Here, overwriting means that old information is simultaneously erased while new information is written.

Several overwriting technologies for magneto-optical recording media have been proposed, and one which has attracted attention is a direct overwriting system using a self-reversible magneto-optical recording medium in which the direction of net remnant magnetization in a portion of the magnetic wall boundary region heated by a laser beam can be reversed by modifying the power level and/or the pulse width of laser pulses between erasing and writing, without changing the direction and intensity of bias magnetic field, since it does not necessitate a significant modification of the optical system, magnet, etc. of a presently commercially available magneto-optical recording apparatus. For examples, see Japanese Unexamined Patent Publication (Kokai) No. 01-251357; J. Appl. Phys. Vol. 63, No. 8 (1988) 3844; IEEE Trans. Magn. Vol. 23, No. 1 (1987) 171; Appl. Phys. Lett. Vo. 49, No. 8 (1986) 473; IEEE Trans. Magn. Vol. 25, No. 5 (1989) 3530; and J. Appl. Phys. Vol. 69, No. 8 (1991) 4967.

A recording layer composed of a layer having a perpendicular easy magnetization axis and a layer having an in-plane easy magnetization axis is known, but the purpose thereof is to improve the sensitivity of the recording layer to the recording magnetic field, as described in Japanese Unexamined Patent Publication (Kokai) Nos. 02-247846 and 04-370550 and in Material for Study in Japan Society of Applied Magnetics.

When an in-plane magnetization layer is used in a domain wall-motion type direct overwriting recording medium, the purpose thereof is to prevent formation of the Bloch wall (Bloch line) by using a permalloy layer, an ion-implanted layer, a surface oxidized layer or a surface crystallized layer as an in-plane magnetization layer with an optimum thickness of 5 to 20 nm, as described in Japanese Unexamined Patent Publication (Kokai) No 63-241739. This publication mentions that the optimum thickness of the in-plane magnetization layer is 5 to 20 nm and an in-plane magnetization layer having a thickness of less than 2 nm does not have the necessary effect in preventing the Bloch wall.

A recording layer composed of a layer having a perpendicular easy magnetization axis and a layer having an in-plane easy magnetization axis is also proposed in Japanese Unexamined Patent Publication Nos. 05-120754 and 05-182264. However, the purpose of providing the layer having an in-plane easy magnetization axis is different from the present invention. In Japanese Unexamined Patent Publication No. 05-120754, a layer having an in-plane easy magnetization axis is magnetized in a direction parallel to the layer both at room temperature and at a raised temperature close to the Curie temperature. In Japanese Unexamined Patent Publication No. 05-182264, the layer having an in-plane easy magnetization axis is magnetized in a direction parallel to the layer at room temperature and in a direction perpendicular to the layer at a raised temperature close to the Curie temperature. Either magneto-optical recording medium provides as high a C/N ratio as that obtained in the present invention.

The present inventors have actually done experiments to evaluate the conventional direct overwriting method. The recording medium used comprised a polycarbonate resin substrate having a diameter of 130 mm and a thickness of 1.2 mm and having groups in the form of spiral with a pitch of 1.6 µm thereon, and a transparent dielectric layer of AlSiN having a thickness of 120 nm formed on the substrate, which AlSiN layer was inverse-sputtered for 10 nm. A 25 nm thick rare-earth transition-metal amorphous alloy magnetic layer of $(Gd_{25}Tb_{75})_{24}(Fe_{90}Co_{10})_{76}$, was then deposited as a self-reversible magneto-optical recording layer on the transparent dielectric layer. A 40 nm thick transparent dielectric layer of AlSiN and 60 nm thick a reflecting layer of AlAuTi were then deposited on the recording layer.

The direct overwriting characteristics of this medium were tested. The medium was set on a drive for evaluation. The rotation speed of the disc was 11.3 m/sec as a linear speed at a point 30 mm from the center of the disc. The recording and erasing were conducted using 7.4 MHz pulses as shown in FIG. 1 while applying an external bias magnetic field of 350 Oe in the direction of writing. The power of a laser beam, at a wavelength of 830 nm, was 8.0 mW for recording and 4.0 mW for erasing. Next, a 1.0 mW DC beam, a continuous wave beam, was applied to the disc to obtain a reproduction signal for evaluation. The reproduced signal had a C/N (carrier to noise) ratio of about 34.0 dB.

Recording and erasing were then conducted on the same track as used for the above evaluation, using 5.5 MHz pulses as shown in FIG. 2 while an external bias magnetic field with an intensity of 350 Oe was applied thereto in the direction of recording. Namely, the signal as shown in FIG. 1 was overwritten by the signal as shown in FIG. 2. The measurement of reproduced signal was then conducted by applying a DC beam, i.e., a continuous beam with a power of 1.0 mW. As a result, it was confirmed that the 7.4 MHz signal originally recorded was erased and only the 5.5 MHz signal was recorded. The C/N ratio at this time was about 34.0 dB.

As seen above, a direct overwriting operation by the above mentioned optical modification method was confirmed. However, the C/N ratios of recording and reproducing were as low as about 34 dB, indicating that a remarkable improvement in the C/N is necessary.

Next, a magneto-optical recording medium as mentioned above except that a 5 nm thick permalloy layer was added to the GdTbFe layer, was prepared and the overwriting characteristics of the disc were examined. The recording sensitivity as well as the C/N ratio of the medium were significantly reduced and an improvement in the C/N ratio could not be obtained.

The object of the present invention is to provide a magneto-optical recording medium in which direct overwriting can be done by modification of power level and/or pulse width of the applied laser pulses without changing direction or intensity of bias magnetic field, and in which the C/N ratio is improved.

DISCLOSURE OF THE INVENTION

In order to attain the above object, the present invention provides a magneto-optical recording medium in which direct overwriting can be done by modification of power level and/or pulse width of the applied laser pulses, said medium comprising a first dielectric layer, a recording layer composed of a first magnetic layer and a second magnetic layer, a second dielectric and metal reflecting layer in this order over a transparent substrate, said first magnetic recording layer comprising a rare-earth transition-metal amorphous alloy and having a perpendicular easy magnetization axis, said first magnetic recording layer having a thickness of 10 to 200 nm and a compensation temperature above room temperature, said second magnetic layer comprising an alloy of a first component of Co and/or Fe with a second component of a rare-earth metal and/or noble metal or an alloy of Co with at least one metal selected from Ti, Cr, Mn, Cu, Zn, Ga and Ge, said second magnetic layer being such a material having an in-plane easy magnetization axis that it has a magnetization axis parallel to the second magnetic layer if formed independently on a dielectric layer, said second magnetic layer having a thickness of not more than 3 nm.

Conventionally, the overwriting is conveniently conducted by applying an Optical pulse to a bit where recording or erasing should be made while an external magnetic field in one direction or the oppsite direction is simultaneously applied. In contrast, in the present invention, the direction and the intensity of the external magnetic field is not changed for both recording and erasing, and typically a higher optical energy is applied to a bit when recording and a lower optical energy is applied to a bit when erasing. By applying a higher optical energy to a bit, the direction of magnetization at the bit becomes opposite to that of the external magnetic field at a raised temperature and is reversed when cooled to room temperature. By applying a lower optical energy to a bit, the direction of magnetization at the bit becomes parallel to the external magnetic field at a raised temperature and is reversed when cooled to room temperature. Thus, recording and erasing are attained respectively.

The first magnetic layer used in the present invention should be able to self-reverse the direction of the net remnant magnetization at least in a portion of a domain wall boundary region heated by a laser beam without change of the direction and intensity of the bias magnetic field. For this reason, the first magnetic layer should be a rare earth-transition metal amorphous alloy having an easy magnetization axis perpendicular to the magnetic layer.

Such a rare earth-transition metal amorphous alloy may be an amorphous alloy comprising as main components, rare-earth and transition metals as TbFe, GdFe, DyFe, GdFeCo, TbFeCo, DyFeCo, GdTbFeCo, TbDyFeCo, GdTbDyFeCo, NdDyFeCo, NdTbDyFeCo, NdFe, PrFe and CeFe. Among them, GdTbFeCo is preferable since it exhibits an excellent overwriting charactristic.

The first magnetic layer may contain other elements up to 10 atomic % as long as the perpendicular easy magnetization axis is not lost. Elements other than the rare earth elements and Fe and Co may be added, for example, Ti, Zr, Hf, V, Nb, Ta, Cr, Mo, W, Tc, Re, Ru, Os, Ir, Si, Ge, Bi, Pd, Au, Ag, Cu, Pt, etc. Particularly, Ti, Zr, Hf, Cr and Re may be preferably added to prevent corrosion of the recording layer by oxidation.

The thickness of the first magnetic layer is between 10 to 200 nm. If the thickness of the layer is less than 10 nm, the layer may become discontinuous or non-uniform, which is a problem in layer structures. If the thickness of the layer is above 200 nm, the thermal capacity of the layer becomes large so that too high a laser power is required for recording and erasing. Further, the thickness of up to 50 nm is preferred when considering the temperature distribution in the medium heated by a laser beam, the laser power margin during recording and erasing, and the durability in repeated reproduction, recording and erasing. Moreover, up to 30 nm in thickness is more preferable in order to improve domain wall movement for erasing operation and thus improve the C/N ratio.

As the second magnetic layer, an in-plane easy magnetization axis layer of permalloy as disclosed in Japanese Unexamined Patent Publication (Kokai) No. 63-241739 is not effective in improvement in the C/N ratio, and deteriorates the overwriting characteristics. In the present invention, the second magnetic layer comprises an alloy of a first component of Co and/or Fe and a second component of a rare earth metal and/or noble metal or an alloy of Co and at least one metal selected from Ti, Cr, Mn, Cu, Zn, Ga and Ge, and is composed of such a material having an in-plane easy magnetization axis that it has an in-plane magnetization axis if formed independently on a dielectric layer, said second magnetic layer having a thickness of not more than 3 nm.

The elements to be combined with Co and/or Fe in the above were selected by various investigations. The provision of the second magnetic layer can prevent lowering of the perpendicular magnetic anisotropy of the first magnetic layer to improve the recording and erasing operation and the characteristics of a domain wall moving-type direct-overwriting magneto-optical recording medium with a metal reflecting layer.

The second magnetic layer is composed of a material which provides an in-plane easy magnetization axis when deposited on a dielectric layer, but it was confirmed that the second magnetic layer formed on the first magnetic layer in the medium of the present invention has a magnetization axis perpendicular to the layer, which is probably due to the thinness of the second magnetic layer and the effect of the first magnetic layer having a perpendicular magnetization axis. This perpendicular magnetization axis of the second magnetic layer appears even at room temperature and an elevated temperature close to the Curie temperature thereof in the present invention. In any case, the desired effect of the present invention, i.e., improvement of C/N ratio in an overwriting magneto-optical recording medium is obtained by using a second magnetic layer made of such a selected material having an in-plane easy magnetization axis as above and having a thickness of not more than 3 nm.

If the thickness of the second magnetic layer is above 3 nm, the C/N ration is reduced in conventional recording and also in overwriting.

The second magnetic layer preferably has a saturated magnetization of not more than 400 emu/cc, more preferably not more than 300 emu/cc, in order to prevent an adverse magneto-optical effect from the second magnetic layer having an in-plane easy magnetization axis to the first magnetic layer having a perpendicular easy magnetization axis. The thickness of the second magnetic layer is also preferably not more than 2 nm from the same reason.

The metal reflecting layer used in the present invention is preferably made of a material having a reflective index higher than that of the recording layer for a laser beam from a driving head, in order to improve the C/N ratio. More specifically, it is preferred to select a material having a refractive index n and an extinction coefficient k at the used laser wavelength where $n \leq 3.5$ and $k \geq 3.5$, more preferably $n \leq 2.5$ and $4.5 \leq k \leq 8.5$. An improvement of the reflection by the reflecting layer results in an increase in the Kerr enhancement effect, and thereby improves the C/N ratio.

On the other hand, if the reflecting layer has too high a thermal conductivity, heat diffusion becomes high and a high laser power is required for recording. Therefore, in order to make it possible to use a semiconductor laser having a power of 10 mW or less, as commonly used at the present, the thermal conductivity of the material of the metal reflecting layer is preferably 100 W/(mK) or less, more preferably 80 W/(mK) or less, further preferably 50 W/(mK) or less. A material satisfying this requirement includes an Au alloy including Al or Ag, i.e., AuAl or AuAg. In these alloys, if the content of Au is less than 0.5 atomic %, the lowering of the thermal conductivity is small, and if the content of Au is more than 20 atomic %, the reflective index of the layer significantly lowers, both of which are disadvantageous to the C/N. Accordingly, the content of Au in the alloy is preferably 0.5 to 20 atomic %. Moreover, it is more preferable that the Au content of the AuAl or AuAg alloy is 0.5 to 15 atomic %, further preferably 0.5 to 10 atomic %, in order to suppress the lowering of the reflective index in relation to that of an Al or Ag single metal layer within 2%, to thereby prevent the lowering of the C/N. A reduction of the content of Au is advantageous in reduction of the cost of a recording medium.

Further, it is preferable to supplementarily add a certain element to the Au alloy, said element being at least one selected from Ti, Zr, Hf, V, Nb, Ta, Cr, Mo, W, Tc, Re, Ru, Os, Ir, etc., in order to reduce the content of Au. The content of the supplementary element should be 5.0 atomic % or less. If the content of the supplementary element is above this range, the reflective index of the reflecting layer and the C/N ratio of the medium are lowered. When the content of the supplementary element is below 50 weight %, lowering of the reflective index of the alloy for a semiconductor laser beam with a wavelength of 830 nm used in a magneto-optical recording and reproducing apparatus can be less than 2%. If the content of the supplementary element is less than 0.3 atomic %, an increase in the thermal conductivity by reducing Au can not be complemented. Accordingly, if the content of Au is in a range of 0.5 to 10 atomic % and said certain element is added, a reduction in the reflective index of the alloy layer can be suppressed within 2% in comparison with that of an Al or Al single metal layer, the cost of the medium can be reduced, and the thermal conductivity of the layer can be set in a range of 20 to 100 W/(mK).

Among the supplementary elements as mentioned above, Ti, Zr, Hf, Ta, Cr and Re are preferable for improving the durability of the reflecting layer.

The thickness of the reflecting layer is 10 to 500 nm, and is preferably 30 to 200 nm, more preferably 40 to 100 nm, in order to suppress a reduction in lowering in the C/N ratio due to a reduction of the reflective index and in order to allow recording by a laser with a power of 10 mW.

The location of the metal reflecting layer is not limited as long as it is on the side of the recording layer opposite to the incident beam side. For example, the metal reflecting layer may be formed directly on the second magnetic layer, or a transparent dielectric layer may be inserted between the second magnetic layer and the metal reflecting layer, or an inorganic and/or organic protecting layer such as a transparent dielectric layer may be formed over the reflecting layer.

It is preferable that a dielectric layer is used as an underlayer for the recording layer, by which the Kerr enhancement effect can be increased. Furthermore, it is preferable that the dielectric layer has a higher refractive index n, that is, 1.6 or more, more preferably 1.8 or more.

The material for the dielectric layer may be AlN, ZnS, $Si_2N_3$, AlSiN, SiO, $SiO_2$, $Zr_2O_3$, $In_2O_3$, $SnO_2$, $Ta_2O_5$, AlON, SiON, ZrON, InOn, SnON or TaON, or a combination thereof. $Si_2N_3$, AlSiN, SiO, $Zr_2O_3$, $Ta_2O_5$, ZrON and TaON are preferable for a refractive index of 1.8 or more and AlSiON is preferable for a high durability.

The substrate used in the present invention is preferably an organic resin material due to its productivity. The organic resin substrate may be a solid organic resin substrate, or a resin layer for providing grooves on a glass substrate cured by a 2P (photosensitive polymer) method.

Such an organic resin used for the substrate may be a polycarbonate resin, acrylic resin, epoxy resin, 2-methylpentene resin, polyoleffin resin or a copolymer thereof. Among them, a polycarbonate resin is preferable for its mechanical strength, durability, thermal resistance, humidity permeation, and cost. Moreover, a solid polycarbonate resin substrate is preferable for its productivity.

The formation of the inorganic layers, i.e., the transparent dielectric layer, the recording layer and the metal reflecting layer, may be by various known deposition methods, including PVD such as sputtering and CVD, etc. Nevertheless, it is preferable for a magneto-optical recording medium to use a method which provides a firm bond to a polymer substrate in order to prevent peeling of the layers under high temperature and high humidity conditions. From this point of view, sputtering is preferable.

An organic protecting layer may be provided on the medium by coating for example, a photo- and/or heat-curing resin or a thermoplastic resin on the medium. A rear protecting layer provided to the side of the substrate opposite to the recording layer preferably extends to cover the side or peripheral surfaces of at least the recording layer.

The waveform of pulses used for recording and erasing or overwriting may not be limited to those as shown in FIGS. 1 and 2. Each pulse of the pulses as shown in FIGS. 1 and 2 may be divided to a series of narrower pulses, and not composed of a continuous single pulse, as shown in Japanese Unexamined Patent Publication (Kokai) No. 01-251357.

The power of optical pulses should be adequately selected based on the recording sensitivity of a medium, i.e., the Curie temperature and the constitution of the medium.

The constitution of a magneto-optical recording medium of the present invention may be various type, including one in which the recording layer is sandwiched by transparent dielectric layers, one in which a metal reflecting layer is located directly in contact with the recording layer on the side opposite to the beam incident side, and one in which an inorganic and/or organic layer is provided as a protecting layer.

An improvement in the C/N ratio may be obtained by smoothing the surface of an underlying layer for a recording layer and/or the surface of a recording layer. For this purpose, the material of the underlying layer for the recording layer or the process conditions for the recording layer may be selected. Conveniently, the surfaces of the underlying layer and the recording layer may be inverse sputtered.

An improvement in the C/N ratio may be obtained by smoothing the surface of an underlying layer and/or the surface of a recording layer to a center line average roughness (Ra) of not more than 1.0 nm, more preferably not more than 0.5 nm, further preferably not more than 0.3 nm. Such a smooth surface may be obtained by controlling the conditions of the reverse sputtering, such as the sputtering power, sputtering gas pressure and sputtering time, with longer sputtering being preferable. The erasing operation is improved by smoothing the surfaces of the underlying and/or recording layers.

In a second aspect of the present invention, in order to attain the object of the present invention mentioned above, i.e., to obtain a higher C/N ratio in a magneto-optical recording medium in which direct overwriting can be done only by modification of power level and/or pulse width of optical pulses, there is provided a medium comprising a substrate, a first dielectric layer, a recording layer, a second dielectric layer and a metal reflecting layer in this order, said substrate comprising a base, a third dielectric layer and a leveling layer, said base having a surface on which guides for an optical-tracking servo in the form of concave and convex lines are formed adjacent to regions for data storage, said base being made of an organic resin at least in a portion where said guides are formed, said third dielectric layer being formed on said base at least in areas where said guides are formed, said leveling layer being formed over said third dielectric layer, said third dielectric layer having a refractive index higher than that of the portion of said base where said guides are formed and that of said leveling layer, said recording layer being composed of a magneto-optical recording layer (first magnetic layer) and a magnetic layer of a material having an in-plane easy magnetization axis (second magnetic layer).

In order to attain servo stable-tracking, guides in the form of concave and convex ridges are provided on the surface of a substrate adjacent to data regions. The guides are formed as grooves in the form of a spiral or concentric circles on the substrate. The control of the tracking servo is conducted by a beam diffracted from the guides.

It is known that the quality of data signal is lowered when the guides in the form of concave and convex are formed adjacent to the data regions. It is considered that since concave and convex ridges are also formed in the magneto-optical recording layer in the data regions adjacent to the guides or grooves, bit shapes or the like are deformed, to thereby reduce the C/N ratio.

Moreover, in the direct overwriting system used in the present invention, erasing occurs when a temperature profile in the medium formed by an erasing laser beam is reaching a recorded bit. More specifically, before the portion of the temperature profile with a maximum temperature reaches the recorded bit and when a portion of a domain wall boundary region reaches a temperature lower than said maximum temperature, the net remnant magnetization there is self-reversed to result in erasing. Accordingly, if the recording layer involves concave and convex guides for the tracking servo, the profiles of the concave and convex guides have adverse effects on the temperature profile and the process of the self-reversing of the net remnant magnetization, which may interfere with the erasing process.

The inventors considered it necessary to provide a substrate allowing stable servo-tracking and having a planar or even top surface on which the recording layer is to be formed. Concerning this technology, Japanese Unexamined Patent Publication (Kokai) No. 03-40248 proposed a system in which a metal reflecting guide layer for tracking is provided on a glass substrate to stably obtain servo-signals tracking with a sufficient intensity and a leveling layer is provided under a recording layer to obtain a reproduction signal with a sufficient intensity and prevent the reproduction signal quality from lowering. This process requires a complex process for forming the metal reflecting guides including etching, which is not suitable to mass production due to low yield and cost, etc.

The second aspect of the present invention provides a magneto-optical recording medium in which overwriting is done by modification of the power level and/or the pulse width of the optical pulses without changing the direction and intensity of the bias magnetic field, in which servo-signals tracking with a sufficient intensity are obtained from guides, a recording layer is formed on an even or planar layer so as to allow a high quality reproduction signal with an improved C/N ratio, and the yield and cost are improved in comparison with the system disclosed in Japanese Unexamined Patent Publication (Kokai) No. 03-40248.

In this aspect, the control of servo-tracking is made using a servo-beam tracking diffracted from guides, where a sufficient intensity of reflection from the guides is essential to attain a stable servo-tracking performance, more specifically reflection not less than 10% of the tracking servo beam is preferably required. This condition can be attained by providing a transparent dielectric layer on the guides of the substrate, the transparent dielectric layer having a refractive index higher than both the base, at least in a portion where the guides are formed, and the leveling layer. The dielectric layer on the guides preferably has a refractive index n of not less than 1.6 ($n \geq 1.6$) for a beam with the wavelength of the tracking servo beam.

Such a dielectric layer having a high refractive index includes AlN, ZnS, $Si_2N_3$, AlSiN, SiO, $SiO_2$, $Zr_2O_3$, $In_2O_3$, $SnO_2$, $Ta_2O_5$, AlON, SiON, ZrON, InOn, SnON or TaON or a combination thereof.

More stable servo-tracking and a higher reproduction signal intensity can be obtained when the dielectric layer has a reflectivity of 15% or more for a beam with the wavelength of the servo tracking beam for which a dielectric material having a refractive index n of not less than 1.8 ($n \geq 1.8$) for the wavelength of a beam for the tracking servo is preferred. In this respect, AlSiN, $Si_2N_3$, $Zr_2O_3$, $Ta_2O_5$, ZrON and TaON are preferable, with AlSiON being particularly preferable because it is highly durable.

The dielectric layer has high reflective indexes periodically based on the thickness of the dielectric layer on the guides. Any thicknesses providing a high reflective index may be adopted, but thinness is generally preferable for productivity. The thickness depends on the required refractive index of the dielectric layer, but in the cases of inorganic nitrides and oxides having a refractive index of 1.6 to 2.3, the thickness d is preferably 20 to 160 nm.

In the case of a dielectric layer of a nitride or oxide, when the degree of nitrization or oxidation is reduced, the light absorption increases to have adverse effect on recording and reproducing characteristics, but the refractive index simultaneously increases to allow the thickness of the dielectric layer for a necessary light reflection to be reduced, thus increasing the productivity.

The dielectric layer may be a single layer or a laminated layer of a plurality of the dielectric materials.

The formation of the dielectric layer may be conducted in the manner mentioned above for the inorganic layers.

This dielectric layer should be formed at least on the guides and is preferably formed entirely over the surface of the substrate having guides for the sake of productivity.

When a dielectric layer having a thickness as small as about 100 nm is formed on the guides, the top surface of the dielectric layer reflects and has the profile of the guides. In order to level or planarize the uneven surface of the dielectric layer, the concave and convex profiles of the guides should be covered, for example, by a coating of a low-viscosity material. A recording layer formed on the thus leveled surface will not be affected in its recording bit shape by the uneven profile of the guides, and a desired bit shape and a large reproduced signal can be obtained.

The thickness t(nm) of the leveling layer is preferably 50 to 500 nm ($50 \leq t \leq 500$). Since the depth of the guides is preferably 40 nm or more, the leveling layer covering the guides should preferably be 50 nm or more. Considering productivity and the light reflectivity for the tracking servo, a thickness of 500 nm or less is preferable.

The material of the leveling layer may be any material which covers the uneven profile of the guides and provides an even top surface, but preferred is a resin for easy production of a layer. Such a resin is not particularly limited as long as it is a resin which can be used on a magneto-optical recording medium. Examples of the resin include ultra-violet curing resins, electron beam curing resins, epoxy resins, silicate resins, urethane resins, polyester resins, thermoplastic resins, etc. Nevertheless, the resin is coated preferably at a low viscosity so as to obtain a desired coating layer and, therefore, it is preferable that the resin is soluble in an ordinary organic solvent.

In the production of magneto-optical recording media, ultra-violet curing resins and electron beam curing resins are often used due to their high productivity and high protecting effect, etc. Ultra-violet curing resins are most often used since it does not require a costly apparatus in comparison with electron beam curing resins. Such ultra-violet curing resins are usually commercially sold and easily available as a composition which comprises a compound (called an oligomer acrylate) having a relatively high molecular weight and obtained by acrylating or methacylating a compound or oligomer having functional groups such as hydroxide or epoxy, for example, an acrylate of bisphenol A-type epoxy compound or oligomer; a compound having a monofunctional group ((meth)acryloyloxy) or two to six functional groups ((meth)acryloyloxy); and a photoinitiator, etc. For example, "SD-17" and "SD-301" from Dainippon Ink and Chemicals Inc., "UR-4502" from Mitsubishi Rayon, and others, are sold commercially. Other, commercially sold electron beam curing resins include "MH-7135" from Mitsubishi Rayon.

The epoxy resins are not particularly limited as long as they can be used in optical discs. Ordinary epoxy resins derived from bisphenol may be used. However, careful selection of a curing agent is needed in order to obtain a necessary transparency. Diamines derived from pentaerythritol are preferable for a high curing rate and transparency. For example, Epomate "N-002" from Yuka Shell K.K. can be mentioned as a preferable curing agent.

Many silicate resins are commercially available and can be used as long as they can be used in optical discs. For example, thermo-curing types such as alkylsilioxane and ultra-violet curing types such as acrylic silicone can be mentioned. Examples thereof are Glass resin "GR-650" from Showa Denko K.K. and "KP-85" and "KNS-5300" from Sin-etsu Chemical Industries Inc.

Thermoplastic resins may be organic polymers which do not affect a recording layer, are soluble in an adequate solvent, particularly in an organic solvent, and provide a uniform transparent coating layer. For example, acrylic resins such as polymethylmethacrylate and polyethylmethacrylate, acrylonitrile resins such as polyacrylonitrile and polymethacrylonitrile, fluorine-containing resins such as vinyl fluoride-hexafluoropropylene copolymer, vinyl resins such as vinyl chloride and vinyl acetate, polyvinylalcohol resins, polyvinylbutylal resins, polyester resins, polyurethane resins, etc., and combinations and copolymers thereof may be preferably used.

The leveling layer may be formed by spin coating, screen printing, roll coating, spray coating, dipping, sputtering and so on. When the leveling layer is formed of a cured resin layer, a resin or a solution of a resin in a diluent is preferred for its handing and spin coating is most preferable for its productivity, cost, etc.

In the spin coating, it is necessary to reduce the viscosity of a resin material in order to form a leveling layer with a thickness as mentioned above. The viscosity of a resin solution at 20° C. before coating is preferably 50 cP or less for a thickness of the leveling layer of 200 to 500 nm and 30 cP or less for a thickness of 50 to 200 nm.

The solvent for dilution is not particularly limited as long as it does not chemically damage the substrate and is evaporated during curing of the resin, but isopropyl alcohol, butyl alcohol and ethyl alcohol, etc. are preferable for easy handling and low toxicity.

The guides formed on the surface of the base preferably have a depth of 40 nm or more to obtain a stable tracking performance. More stable tracking performance can be obtained by a depth of 70 nm or more The shape of the guides is not particularly limited, but V-shape grooves are preferable for obtaining improved reflection the guides or from a dielectric layer on the guides.

At present, guides used in optical discs for tracking servo are in a concentric or spiral form with a pitch of about 1.6 μm, but the guides used in the present invention are not limited thereto. Also, the pitch of the guides may be narrower than 1.6 μm.

In the second aspect of the present invention, the first magnetic layer, i.e., the magneto-optical recording layer may be any perpendicular magnetization layer which can self-reverse the direction of the net remnant magnetization at least in the portion of the domain wall boundary region heated by the application of a laser beam, without the direction and intensity of a bias magnetic field being changed. For example, a rare earth-transition metal amorphous alloy layer, i.e., a layer of an amorphous alloy comprising as main components rare earth and transition metals such as TbFe, GdFe, DyFe, GdFeCo, TbFeCo, DyFeCo, DyTbFeCo, GdTbFeCo, GdDyFeCo, TbDyFeCo, GdTbDyFeCo, NdDyFeCo, NdTbDyFeCo, NdFe, PrFe or CeFe, as well as a garnet layer may be used.

The first magnetic layer may contain up to 10 atomic % of other element as long as the perpendicular easy magnetization axis is not lost, as previously described for the first magnetic layer before with respect to the first aspect of the present invention.

In order to obtain a high C/N ratio, the first magnetic layer preferably has a compensation temperature (Tcomp) of 50° to 250° C. and a Curie temperature (Tc) of 100° to 350° C., with Tcomp of 80° to 160° C. and Tc of 200° to 250° C. being more preferable.

The thickness of the first magnetic layer is between 10 and 200 nm.

Further, it is preferred that the total thickness of the first and second magnetic layers is not more than 150 nm, more preferably not more than 60 nm, further preferably not more than 40 nm, in order to improve the Kerr enhancement effect and obtain a high C/N ratio.

The second magnetic layer having an in-plane easy magnetization axis is any magnetic layer having an in-plane easy magnetization axis, and includes permalloy, Fe, FeCo, Ni, CoNi, PtCo and rare earth-transition metals and others. However, the second magnetic layer having an in-plane easy magnetization axis of the second aspect of the present invention does not necessarily have the direction parallel to the layer when it is actually deposited on the first magnetic layer which is a perpendicular magnetization layer, as previously described with respect to the first aspect of the present invention. The second magnetic layer of the first aspect of the present invention has a direction of magnetization perpendicular to the layer, but the second magnetic layer of the second aspect of the present invention may has the direction of magnetization parallel to the layer.

The second magnetic layer having an in-plane easy magnetization axis may be formed by treating the surface of the first magnetic layer, i.e., a magneto-optical recording layer with a gas of Ar, $H_2$, $N_2$, $O_2$, $CO_2$, CO, $NO_2$, or a mixture of one or more of these, for example, by plasma treatment, reverse sputtering, ion implantation.

In order to obtain a higher C/N ratio in direct overwriting, the second magnetic layer preferably has a Curie temperature (Tci) close to the Curie temperature (Tcw) of the first magnetic layer, specifically (Tcw−100)≦Tci≦(Tcw+200), more preferably (Tcw−100)≦Tci≦(Tcw+100). When the first magnetic layer is a rare earth-transition metal alloy layer having a Curie temperature of 150° to 350° C., the above range of the Curie temperature Tci can be obtained by selecting the composition of $Pt_{100-x}Co_x$, and PtCo is chemically stable and easy in deposition. Therefore PtCo is a preferable material for the second magnetic layer and, in the above consideration, $Pt_{100-x}Co_x$ (10≦x≦60) is preferable and $Pt_{100-x}Co_x$ (15≦x≦40) is more preferable.

When the second magnetic layer is made of a material such as a metal or alloy absorbing a laser beam, it is preferred that the total thickness of the first and second magnetic layers is preferably in a range of 15 to 100 nm, more preferably not more than 60 nm, further preferably not more than 40 nm.

The second magnetic layer may be located on either side of the first magnetic layer but is preferably on the side of the first magnetic layer opposite to the substrate for a higher C/N ratio.

Of course, it is preferable that the first and second aspects of the present invention are combined together. That is, the specific second magnetic layer disclosed in the first aspect of the present invention is applied to the second aspect of the present invention.

The other portions and the constitution of the magneto-optical recording medium, e.g., the dielectric layer, the metal reflecting layer, the protecting layer, etc. and the constitution of the medium, may be the same as described before with respect to the first aspect of the present invention.

In addition, the first and second dielectric layers may be the same as described in the first aspect of the present invention for the dielectric layer on the substrate. However, the thickness of the first dielectric layer is preferably 50 to 150 nm, more preferably 60 to 120 nm. The thickness of the second dielectric layer is preferably 10 to 80 nm, more preferably 30 to 60 nm.

In the third aspect of the present invention, there is also provided a magneto-optical recording medium in which overwriting can be done by modification of the power level and/or the pulse width of optical pulses, said medium comprising a substrate, a first transparent dielectric layer, a recording layer of a first magnetic layer and a second magnetic layer, a second transparent dielectric layer and a metal reflecting layer in this order, said first magnetic layer being a magneto-optical recording layer, said second magnetic layer having an in-plane easy magnetization axis, said first magnetic layer having a Curie temperature Tcw (°C.), a compensation temperature Tcom (°C.) and a thickness t (nm), said second magnetic layer having a Curie temperature Tci (°C.), said metal reflecting layer having a thickness d (nm) and a product λd (μW/K) of a thermal conductivity λ and a thickness d where μ stands for $10^{-6}$, W stands for Watt and K denotes the absolute temperature), wherein 100≦Tcw≦220, room temperature<Tcom<Tcw, 15≦t≦60, Tcom≦Tci≦(Tcw+100), d≧40, 2.0≦λd≦20 and Tcw≦(−10×λd+300).

The inventors investigated the shape of domains in a medium, after being overwritten using a polarizing microscope. It was expected that separated domains corresponding only to the recording level $P_H$ of the laser power in FIGS. 1 and 2 should be formed or recorded, but, in fact, the erasing level $P_L$ of the laser power also caused recording to couple the adjacent domains, so that a long continuous magnetic domain having wide portions corresponding to the $P_H$ and narrow portions corresponding to the $P_L$ was formed. It is therefore considered that the magneto-optical contrast of the recorded domains were as a result decreased to lower the C/N ratio. The reasons for this undesired domain shape are thought to be a thermal factor in which the temperature profile of the recording layer heated by the $P_H$ level is not adequate so that erasing operation by movement of the magnetic wall is not sufficient, as well as a magnetic factor in which the intensity of the applied magnetic field providing the maximum C/N ratio in overwriting is as high as 350 Oe.

The third aspect of the present invention provides a magneto-optical recording medium having a significantly improved C/N ratio.

The inventors discovered, after investigating the temperature profile during erasing, that the C/N ratio in direct overwriting can be improved by making the thickness of the metal reflecting layer thicker and/or the thermal conductivity of the metal reflecting layer higher so as to control the thermal profile, in a magneto-optical recording medium comprising a substrate, a first transparent dielectric layer, a recording layer of a first magnetic layer and a second magnetic layer, a second transparent dielectric layer and a metal reflecting layer in this order.

That is, it was found that, in order to obtain a C/N ratio of 40 dB or more (C/N≧40 dB) by overwriting, it is necessary that the product λd of the thickness d of the metal reflecting layer and the thermal conductivity λ be 2.0 μW/K or more. This is thought to be because increasing the product λd of the metal reflecting layer varies the temperature profile to be formed by a laser beam during erasing, so that the movement operation of magnetic wall is improved.

However, if the product λd of the metal reflecting layer increases, the thermal diffusion from the recording layer to the metal reflecting layer increases so that the recording sensitivity decreases and a high laser power is required. At present, semiconductor lasers often used in commercially available drives for magneto-optical recording drives have a maximum laser power of 9 to 10 mW. In order to make overwriting possible, the product λd of the metal reflecting layer should be 20 μW/K or less.

Moreover, since the product λd of the metal reflecting layer used in the third aspect of the present invention is higher than the λd of 1.0 to 1.5 μW/K adopted at present in commercially available magneto-optical recording media, it is possible that the recording sensitivity decreases. Accordingly, in order to make the recording sensitivity of the medium equivalent to those of commercially available magneto-optical recording media, in accordance with the third aspect of the present ivention, the Curie temperature (Tcw:°C.) of the magneto-optical recording medium is lowered.

Namely, when the metal reflecting layer with $2.0 \leq \lambda d \leq 20$ is used, it is necessary that the composition of the magneto-optical recording layer is selected so as to have a Curie temperature (Tcw:°C.) of 100° to 220° C. In this case, the Curie temperature (Tcw:°C.) is preferably 150° to 200° C., more preferably 170° to 200° C., in order to stably obtain a C/N of 40 dB or more.

Further, in order to exhibit the above effect, the thermal conductivity and/or the thickness of the metal reflecting layer should be adjusted and said λd should be adequately selected. For example, where a metal reflecting layer having a low thermal conductivity is used, it is necessary that the thickness of the reflecting layer should be made larger so as to increase the λd, to thereby control the temperature profile during laser application. On the other hand, where a metal reflecting layer having a high thermal conductivity is used, the thickness of the metal reflecting layer may be smaller that where a metal reflecting layer having a low thermal conductivity is used. However, the thickness of the metal reflecting layer should have a thickness d (nm) of $d \geq 40$ for its reflectivity and durability.

Here, the material of the magneto-optical recording layer (first magnetic layer) may be any perpendicular magnetization layer in which the direction of the net remnant magnetization can be self-reversed along with the movement of magnetic wall without changing the direction and intensity of the bias magnetization at least in a portion of magnetic wall boundary region heated by a laser beam, and which has a compensation temperature Tcom between room temperature and the Curie temperature Tcw. For example, an amorphous alloy layer comprising rare-earth and transition metals such as TbFeCo, GdFeCo, GdTbCo, GdTbFeCo, GdDyFeCo, NdDyFeCo or NdTbDyFeCo and a garnet layer may be mentioned. Among them, GdTbFeCo is preferable since it exhibits excellent overwriting characteristics.

The material of the metal reflecting layer used in this aspect is not particularly limited as long as the layer satisfies $d \geq 40$ and $2.0 \leq \lambda d \leq 20$ where d denotes the thickness (nm) and λ denotes the thermal conductivity (W/mK)[m: meter], i.e., the unit of λd is μW/K. More specifically, when a metal material falling in $2.0 \leq \lambda d \leq 20$ and $5 \leq \lambda \leq 100$ is used, it is practical to select a material having a thickness of 60 to 400 nm. When a metal material falling in the range $2.0 \leq \lambda d \leq 20$ and $100 \leq \lambda \leq 200$ is used, it is practical to select a material having a thickness of 40 to 200 nm.

On the other hand, if the Curie temperature Tcw of the metal reflecting layer is set to a relatively high value, it is impossible to use a metal reflecting layer having a high λd when direct overwriting operation is to be conducted with a laser power of 10 mW or less. To solve this problem, the compensation temperature Tcom and the product λd should be set within a certain range. It was discovered that the range should be $Tcw \leq -10 \times \lambda d + 300$.

Furthermore, it is preferable that an improvement in the C/N ratio of a medium can be obtained by selecting a suitable material for the metal reflecting layer wherein $n \leq 3.5$ and $k \leq 3.5$, preferably $n \leq 2.5$ and $4.5 \leq k \leq 8.5$ (n denotes the refractive index and k denotes the extinction coefficient) for a beam with a wavelength of 830 nm.

The materials satisfying the above conditions are typically Al and Ag. Al and Ag are sensitive to corrosion but AlAu and AgAu alloys are resistant to corrosion. In these alloys, the effect of improving the corrosion resistance appears at an Au content of 0.5 atomic % or more, but if the content of Au is more than 20 atomic %, the reflective index of the layer Ralls significantly. Accordingly, the content of Au in the alloy is preferably 0.5 to 20 atomic %. Moreover, it is preferable that the Au content of the AuAl or AuAg alloy is 0.5 to 15 atomic %, more preferably 0.5 to 10 atomic %, in order to suppress the lowering of the reflective index in relation to that of an Al or Ag single metal layer to within 2%, to thereby prevent the lowering of the C/N.

Another element such as Ti may be further added to the AlAu and AgAu alloys as previously described with respect to the first and second aspects of the present invention.

The first and second dielectric layers may be as previously described with respect to the first and second aspects of the present invention.

The first and second magnetic layers also may be as previously described with respect to the first and second aspects of the present invention.

In the materials mentioned for the second magnetic layer having an in-plane easy magnetization axis, it is necessary, for attaining a high C/N ratio in overwriting, that the relationship between the Curie temperature Tcw (°C.) and the compensation temperature Tcom (°C.) of the magneto-optical recording layer is: $Tcom \leq Tci \leq (Tcw+100)$, or more preferably, $Tcom \leq Tci \leq (Tcw+50)$.

For this purpose, where a rare earth-transition metal alloy layer having a Curie temperature of 100 to 200° C. as the magneto-optical recording layer is used, a PtCo alloy is the preferred alloy since $Pt_{100-x}Co_x$ permits a Curie temperature as specified above by selecting the composition, and the PtCo alloy is chemically stable and is easy to produce and deposit. Particularly, a $Pt_{100-x}Co_x$ alloy with $10 \leq x \leq 60$ is preferable, with $15 \leq x \leq 40$ being more preferable.

The effect of providing the second magnetic layer having an in-plane easy magnetization layer is to reduce the intensity of applied magnetic field where a maximum C/N in overwriting is obtained. Using this effect, recording or writing during application of a laser beam with the erasing power level PL can be prevented so that the magneto-optical contrast of domains is increased, to thereby improve the C/N ratio.

Thus, in the third aspect of the present invention, by optimizing all parameters of the Curie temperature Tcw and the compensation temperature Tcom of the first magnetic layer having a perpendicular magnetization axis, the Curie temperature of the second magnetic layer having an in-plane easy magnetization axis and the product λd of the metal reflecting layer and the thicknesses of the respective layers, the overwriting operation can be improved, from the thermal and magnetic aspects so that a higher C/N ratio can be obtained during overwriting than that obtained using conventional constitutions.

BRIEF DESCRIPTION OF THE DRAWINGS

FIG. 4A is a combination of two perpendicular magnetization layers and FIG. 4D is a combination of perpendicular and in-plane magnetization layers.

FIG. 10 is a table showing the results of testing Examples 31 to 52 and Reference examples 1 to 12.

EXAMPLES

Figure 1:
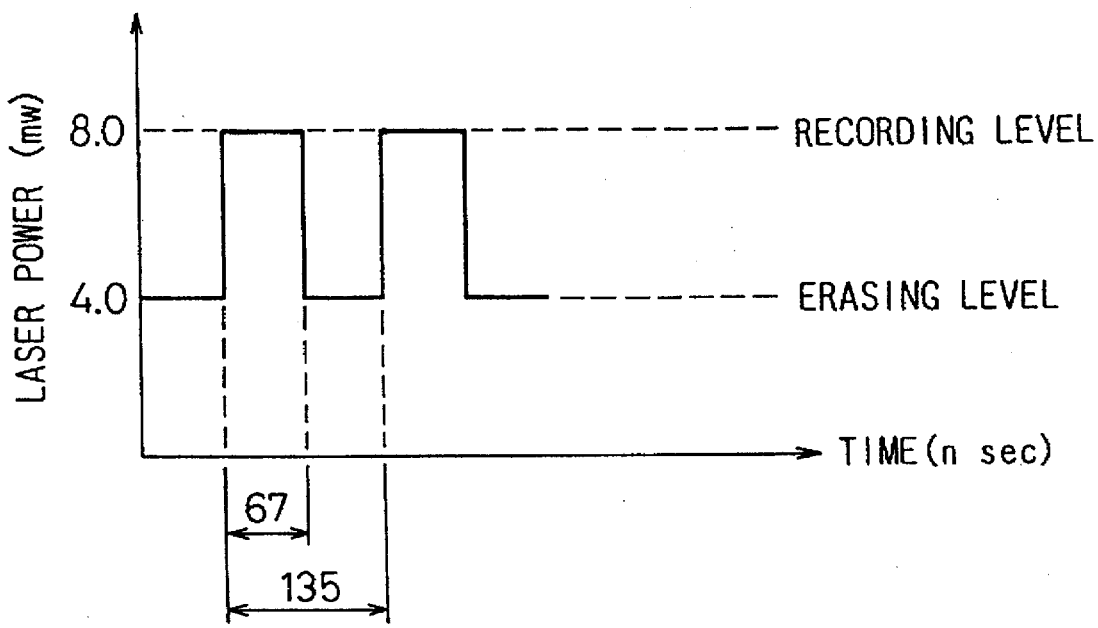
FIGS. 1 and 2 show the waveforms of optical pulses used for overwriting.

In the following Examples and Reference examples, the thermal conductivity of a metal reflecting layer was determined by forming a reflecting layer and evaluating the characteristics thereof, as described below.

A quartz plate (20×20×1 mm) as the substrate was fixed in a vacuum chamber of a three target radio frequency magnetron sputtering apparatus (ANELVA SPE-430H-type) which was evacuated to 53 μPa ($4 \times 10^{-7}$ Torr).

Ar gas (99.999%) was introduced into the vacuum chamber and the gas flow was regulated to a pressure of 0.67 Pa (5 mTorr). The target used was a disc of Al or Ag 100 mm diameter and 5 mm thick optionally combined with Ti chips (5×5×1 mm) thereon. Radio frequecy sputtering was conducted at a discharge power of 100 W and a discharge frequency of 100 W, to deposit an alloy layer with a necessary composition and a thickness of 100 nm.

This sample was used to evaluate the thermal conductivity $\lambda$ (W/mK). The measurement of the thermal conductivity $\lambda$ was conducted as below: the electrical conductivity was determined by the four terminal method and the electrical conductivity obtained was then reduced to the thermal conductivity using Wiedemann-Franz's law.

As a result, $Al_{91}Au_7Ti_2$ was found to have a $\lambda=20$ W/mK and $Ag_{93}Au_5Ti_2$ was found to have a $\lambda=50$ W/mK.

The Curie temperature of a magneto-optical recording layer (first magnetic layer) and an in-plane easy magnetization magnetic layer (second magnetic layer) was measured by depositing a magnetic layer over a glass substrate, with the magnetic layer being sandwiched in AlSiN dielectric layers. The magnetic layer evaluated included GdTbFeCo, GdTbFe, TbFe and PtCo alloys.

A slide glass was fixed in the same sputtering apparatus as used for the above thermal conductivity measurement, whose vacuum chamber was evacuated to 53 μPa.

A target used was a sintered disc of AlSi (50:50) with a diameter of 100 mm and a thickness of 5 mm. An Ar/$N_2$ mixed gas (30 vol %-$N_2$) was introduced into the vacuum chamber and the flow rate was adjusted to obtain a pressure of 0.4 Pa. Radio frequency sputtering was conducted at a discharge power of 400 W and a discharge frequency of 13.56 MHz to deposit 110 nm thick AlSiN layer on the slide glass.

A magnetic layer was then deposited on the AlSiN dielectric layer. The target was changed to sintered discs of $Gd_6Tb_{20}Fe_{66}Co_8$, $Gd_6Tb_{20}Fe_{71}Co_3$, $Gd_6Tb_{20}Fe_{73}Co_1$, $Gd_6Tb_{20}Fe_{74}$ and $Tb_{26}Fe_{74}$ alloys and a Pt disc with Co chips, the sputtering gas was pure Ar (99.999% purity), the gas pressure was 0.67 Pa and the discharge power was 100 W. DC sputtering was conducted to deposit the six magnetic layers on the AiSiN layer. The thickness of the magnetic layer was 20 nm for a layer of GdTbFeCo, GdTbFe or TbFe and 2 nm for a PtCo layer.

The target was again changed to the AlSiN target as above and the gas was to Ar/$N_2$ ($N_2$-30 vol %), and the deposition was conducted under the same conditions for the above underlying AlSiN layer. The thickness of the layer was 45 nm.

The Curie temperatures of the respective alloys of the thus obtained samples were determined by a vibrating sample magnetometer (VSM) to reveal that $Gd_6Tb_{20}Fe_{66}Co_8$ had a Tcw=240° C., that $Gd_6Tb_{20}Fe_{71}Co_3$ Tcw=180° C., $Gd_6Tb_{20}Fe_{73}Co_1$ Tcw=150° C., $Gd_6Tb_{20}Fe_{74}$ had a Tcw=120° C., $Tb_{26}Fe_{74}$ had a Tcw=80° C. and $Pt_{80}Co_{20}$ had a Tcw=150° C.

Examples 1–30 and Comparative examples 1–5

Figure 3:
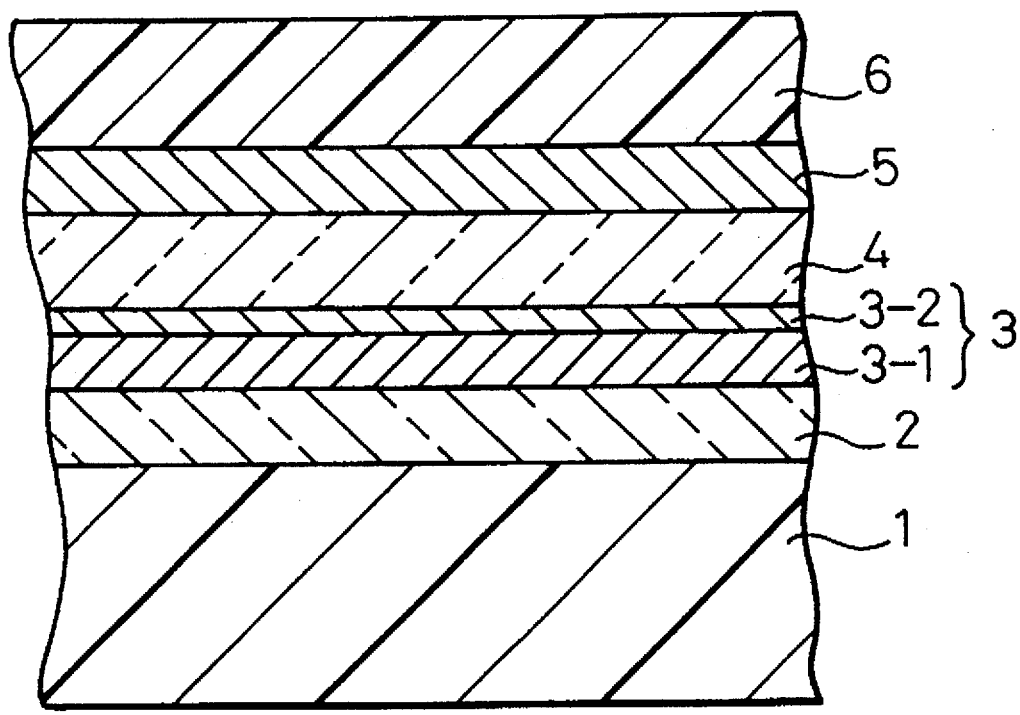
FIG. 3 is a sectional view of a magneto-optical recording medium used in the Examples.

Magneto-optical recording media as shown in FIG. 3 were prepared and evaluated. In FIG. 3 1 denotes a substrate having guides on the surface thereof, 2 a first dielectric layer, 3 a recording layer comprising a first magnetic layer 3-1 and a second magnetic layer 3-2, 4 a second dielectric layer, 5 a metal reflecting layer and 6 a protecting layer.

A polycarbonate resin (PC) substrate 1 having a diameter of 130 mm and a thickness of 1.2 mm and having spiral grooves with a pitch of 1.6 μm was set in a vacuum chamber of a three target radio frequency magnetron sputtering apparatus (ANELVA SPF-430H) and the vacuum chamber was evacuated to 53 μPa. The substrate 1 was rotated at 15 rpm during deposition.

An AlSiN layer was first deposited as the first dielectric layer 2 on the substrate 1. The target used was a sintered disc of AlSi (50:50) with a diameter of 100 mm and a thickness of 5 mm. An Ar/$N_2$ mixed gas (30 vol %-$N_2$) was introduced into the vacuum chamber and the flow rate was adjusted to obtain a pressure of 0.4 Pa. Radio frequency sputtering was conducted at a discharge power of 400 W and a discharge frequency of 13.56 MHz to deposit a 110 nm thick AlSiN layer as the first dielectric layer 2.

The first magnetic layer 3-1 was then deposited on the first dielectric layer 2. The target was changed to a sintered GdTbFeCo disc, the sputtering gas was pure Ar (99.999% purity), the gas pressure was 0.67 Pa and the discharge power was 200 W. DC sputtering was thus conducted to deposit the first magnetic layer 3-1 of a rare earth-transition metal alloy of $(Gd_{25}Tb_{75})_{24}(Fe_{90}Co_{10})_{76}$ with a thickness of 110 nm.

The second magnetic layer 3-2 was then deposited on the first magnetic layer 3-1. The target was changed to a composite target of a Co or Fe disc with chips of rare earth metal or others thereon, the sputtering gas was pure Ar (99.999% purity), the gas pressure was 0.67 Pa and the discharge power was 200 W. DC sputtering was thus conducted to deposit the second magnetic layer 4 of a Co alloy.

The second dielectric layer was then deposited on the second magnetic layer 3-2. The target and the sputtering gas were again the sintered AlSi disc and the Ar/$N_2$ mixed gas as used above and sputtering was conducted under the conditions used for the first dielectric layer 2 to deposit an AlSiN layer 4 with a thickness of 400 nm.

The metal reflecting layer 5 was finally deposited on the second dielectric layer 4. The target was changed to an AlAuTi alloy target, the sputtering gas was pure Ar (99.999% purity), the gas pressure was 0.67 Pa and the discharge power was 100 W. DC sputtering was thus conducted to deposit an $Al_{92}Au_5Ti_3$ alloy layer with a thickness of 60 nm.

The thus prepared sample was taken out from the sputtering apparatus and set on a spin-coater. An ultra-violet curing phenol novolak epoxy acrylate resin was coated on the disc while rotating the disc at 3000 rpm and the disc was transferred through an ultra-violet irradiation apparatus to cure the resin, to thereby form an organic resin protecting layer 6. The thickness of the resin was about 20 μm and the coating solution had a viscosity of 500 cP with a diluent of butyl alcohol.

Thus, magneto-optical recording media having the constitution as shown in FIG. 3 were obtained. The composition and thickness of the first and second magnetic layers of the media are shown in Table 1 below.

Figure 2:
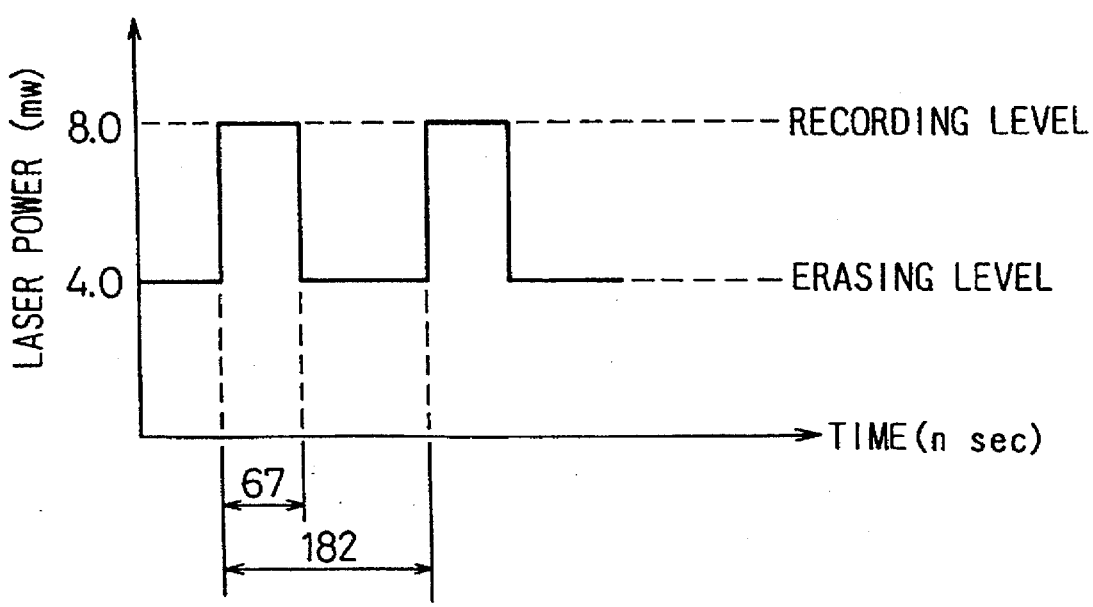

The C/N ratios of these media, after overwriting, were then measured. Direct overwriting was conducted by applying optical pulses, as shown in FIGS. 1 and 2, to the disc at a point 30 mm from the center while rotating the disc at 3600 rpm (linear speed was 11.3 m/sec) and applying a bias magnetic field of 350 Oe in the direction of bit recording. In FIG. 1, the levels and duration of the laser power were 8.0 mW and 67 nanoseconds for recording and 4.0 mW and 68 nanoseconds for erasing. In FIG. 2, the levels and durations of the laser power were 8.0 mW and 67 nanoseconds for recording and 4.0 mW and 115 nanoseconds for erasing. After the overwriting, the reproduction signal from the overwritten samples was measured by applying a continuous beam at 1.0 mW to determine the C/N ratio of the reproduced signal. That is, optical pulses, as shown in FIG. 1, were applied to record in the disc, the disc was then overwritten with optical pulses as shown in FIG. 2, and the C/N ratio was then measured. The thus obtained C/N ratios are shown in Table 1.

TABLE 1

| Sample | First magnetic layer Composition | Thickness (nm) | Second magnetic layer Composition | Thickness (nm) | Saturated magnetization (emu/cc) | C/N (dB) |
|---|---|---|---|---|---|---|
| Ex. 1 | $Gd_6Tb_{18}Fe_{68}Co_8$ | 25 | $Co_{20}Pt_{80}$ | 1.0 | 270 | 40 |
| Ex. 2 | $Gd_6Tb_{18}Fe_{68}Co_8$ | 25 | $Co_{20}Pt_{80}$ | 1.5 | 270 | 43 |
| Ex. 3 | $Gd_6Tb_{18}Fe_{68}Co_8$ | 25 | $Co_{20}Pt_{80}$ | 2.0 | 270 | 43 |
| Ex. 4 | $Gd_6Tb_{18}Fe_{68}Co_8$ | 25 | $Co_{20}Pt_{80}$ | 3.0 | 270 | 38 |
| Ex. 5 | $Gd_6Tb_{18}Fe_{68}Co_8$ | 25 | $Co_{10}Pt_{90}$ | 2.0 | 10.6 | 43 |
| Ex. 6 | $Gd_6Tb_{18}Fe_{68}Co_8$ | 25 | $Co_{25}Pt_{75}$ | 2.0 | 290 | 43 |
| Ex. 7 | $Gd_6Tb_{18}Fe_{68}Co_8$ | 25 | $Co_{30}Pt_{70}$ | 2.0 | 400 | 42 |
| Ex. 8 | $Gd_6Tb_{18}Fe_{68}Co_8$ | 25 | $Co_{50}Pt_{50}$ | 2.0 | 680 | 40 |
| Ex. 9 | $Gd_6Tb_{18}Fe_{68}Co_8$ | 25 | $Co_{70}Pt_{30}$ | 2.0 | 1170 | 38 |
| Ex. 10 | $Gd_6Tb_{18}Fe_{68}Co_8$ | 25 | $Co_{20}Pd_{80}$ | 2.0 | 250 | 41 |
| Ex. 11 | $Gd_6Tb_{18}Fe_{68}Co_8$ | 25 | $Co_{30}Pd_{70}$ | 2.0 | 350 | 42 |
| Ex. 12 | $Gd_6Tb_{18}Fe_{68}Co_8$ | 25 | $Co_{20}Au_{80}$ | 2.0 | 230 | 41 |
| Ex. 13 | $Gd_6Tb_{18}Fe_{68}Co_8$ | 25 | $Co_{25}Gd_{75}$ | 2.0 | 50 | 41 |
| Ex. 14 | $Gd_6Tb_{18}Fe_{68}Co_8$ | 25 | $Co_{30}Tb_{70}$ | 2.0 | 50 | 41 |
| Ex. 15 | $Gd_6Tb_{18}Fe_{68}Co_8$ | 25 | $Co_{30}Dy_{70}$ | 2.0 | 30 | 40 |
| Ex. 16 | $Gd_6Tb_{18}Fe_{68}Co_8$ | 25 | $Fe_{25}Pt_{75}$ | 2.0 | 350 | 42 |
| Ex. 17 | $Gd_6Tb_{18}Fe_{68}Co_8$ | 25 | $Fe_{30}Pt_{70}$ | 2.0 | 510 | 38 |
| Ex. 18 | $Gd_6Tb_{18}Fe_{68}Co_8$ | 25 | $Fe_{25}Pd_{75}$ | 2.0 | 320 | 41 |
| Ex. 19 | $Gd_6Tb_{18}Fe_{68}Co_8$ | 25 | $Fe_{80}Nd_{20}$ | 2.0 | 720 | 38 |
| Ex. 20 | $Gd_6Tb_{18}Fe_{68}Co_8$ | 25 | $Fe_{30}Nd_{70}$ | 2.0 | 230 | 41 |
| Ex. 21 | $Gd_6Tb_{18}Fe_{68}Co_8$ | 25 | $Fe_{70}Gd_{30}$ | 2.0 | 120 | 42 |
| Ex. 22 | $Gd_6Tb_{18}Fe_{68}Co_8$ | 25 | $Co_{30}Cr_{70}$ | 2.0 | 10 | 39 |
| Ex. 23 | $Gd_6Tb_{18}Fe_{68}Co_8$ | 25 | $Co_{80}Cr_{20}$ | 2.0 | 330 | 40 |
| Ex. 24 | $Gd_6Tb_{18}Fe_{68}Co_8$ | 25 | $Co_{85}Mn_{15}$ | 2.0 | 690 | 37 |
| Ex. 25 | $Gd_6Tb_{18}Fe_{68}Co_8$ | 25 | $Co_{75}Mn_{25}$ | 2.0 | 90 | 40 |
| Ex. 26 | $Gd_6Tb_{18}Fe_{68}Co_8$ | 25 | $Co_{85}V_{15}$ | 2.0 | 260 | 39 |
| Ex. 27 | $Gd_6Tb_{18}Fe_{68}Co_8$ | 25 | $Co_{92}Ti_8$ | 2.0 | 240 | 39 |
| Ex. 28 | $Gd_6Tb_{18}Fe_{68}Co_8$ | 25 | $Co_{50}Zn_{50}$ | 2.0 | 130 | 39 |
| Ex. 29 | $Gd_6Tb_{18}Fe_{68}Co_8$ | 25 | $Co_{30}Ga_{70}$ | 2.0 | 60 | 39 |
| Ex. 30 | $Gd_6Tb_{18}Fe_{68}Co_8$ | 25 | $Co_{30}Ge_{70}$ | 2.0 | 30 | 39 |
| Com. Ex. 1 | $Gd_6Tb_{18}Fe_{68}Co_8$ | 25 | | | | 34 |
| Com. Ex. 2 | $Gd_6Tb_{18}Fe_{68}Co_8$ | 70 | $Co_{20}Pt_{80}$ | 2.0 | 270 | 31 |
| Com. Ex. 3 | $Gd_6Tb_{18}Fe_{68}Co_8$ | 25 | $Co_{20}Pt_{80}$ | 4.0 | 270 | 34 |
| Com. Ex. 4 | $Gd_6Tb_{18}Fe_{68}Co_8$ | 25 | $Co_{20}Pt_{80}$ | 5.0 | 270 | 32 |
| Com. Ex. 5 | $Gd_6Tb_{18}Fe_{68}Co_8$ | 25 | $Fe_{22}Ni_{78}$ | 5.0 | 750 | 26 |

Figure 4A:
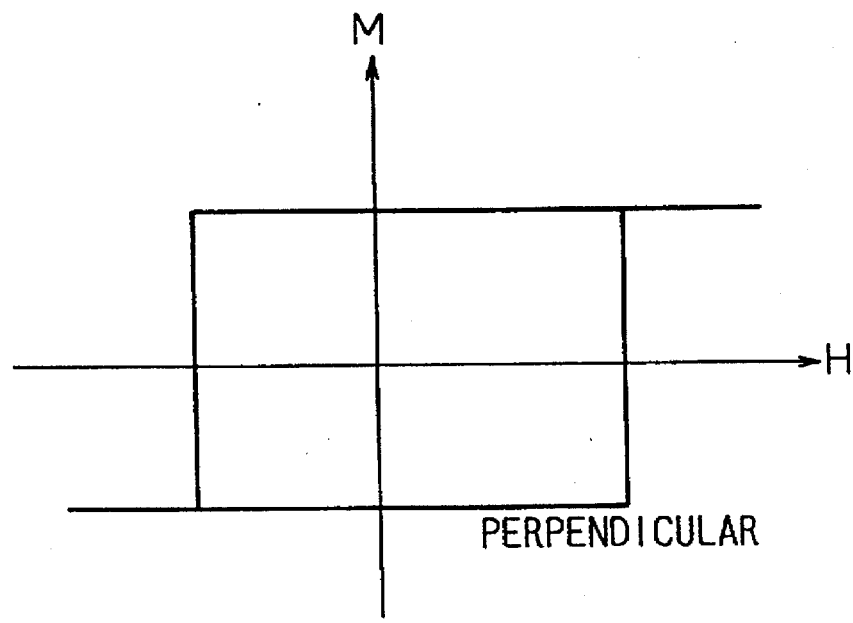
FIGS. 4A and 4B show the magnetization curves used for determination of the direction of the magnetization.
Figure 4B:
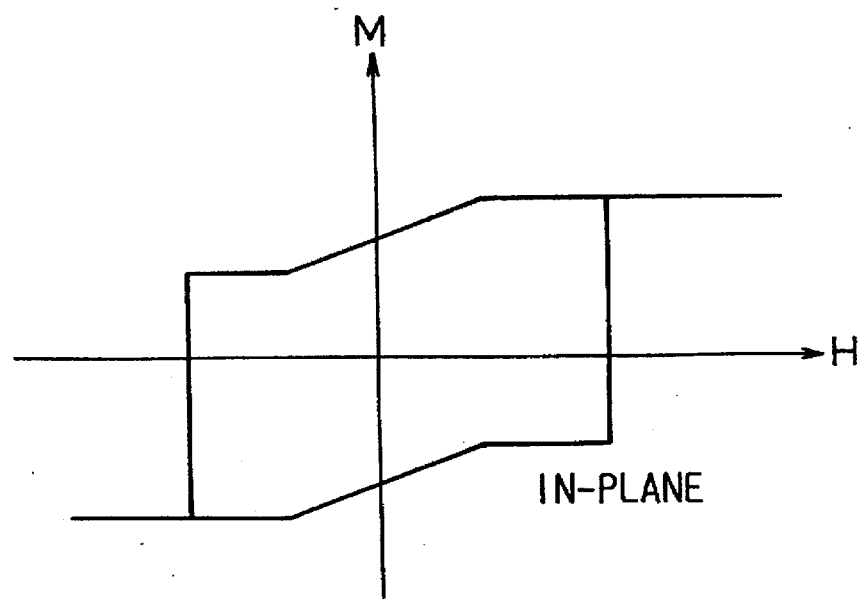

It is known that the magnetic materials used for the second magnetic layer 3-2 have an in-plane easy magnetization axis, that is, if the material is deposited on a dielectric layer, the magnetization axis is parallel to the deposited layer. Also, even if the material is deposited on a perpendicularly magnetized layer, the deposited layer usually exhibits a magnetization axis parallel to the deposited layer. However, it was confirmed that the second magnetic layer 3-2 in the Examples 1 to 30 had a magnetization axis perpendicular to the deposited layer. Here, the direction of the magnetization was determined from the characteristics of magnetization of the layer near the zero magnetization in the measured magnetization obtained by a vibrating sample magnetometer or Kerr loop tracer. FIGS. 4A and 4B show the typical magnetization loops exhibiting the directions of the magnetization parallel and perpendicular to the layer. These loops were obtained from a lamination of two perpendicular layers (FIG. 4A) and a lamination of perpendicular and m-plane layers. In FIGS. 4a and 4B, the abscissa represents the applied magnetic field and the ordinate represents the magnetization. FIG. 4A shows the magnetization perpendicular to the layer. FIG. 4B shows the magnetization parallel to the layer. In contrast, Comparative examples 3 to 5 showed the magnetization parallel to the layer, which is probably due to the thickness of the second magnetic layer.

It is seen from comparison of Examples 1 to 9 with Comparative Examples 1, 3 and 4 that use of a CoPt alloy layer as an in-plane easy magnetization layer provides an improvement in the direct overwritting characteristics. Further, the thickness of the CoPt alloy layer is preferably not more than 3.0 nm and the saturated magnetization of the layer is preferably not more than 400 emu/cc, more preferably not more than 300 mu/cc, in order to provide excellent direct overwritting characteristics. If the recording layer is too thick, the effect of the in-plane easy magnetization layer is reduced as shown inComparative example 2. The above is also seen in the cases when other alloys are used for the second magnetic layer.

Examples 31–37 and Comparative examples 6–9

Figure 5:
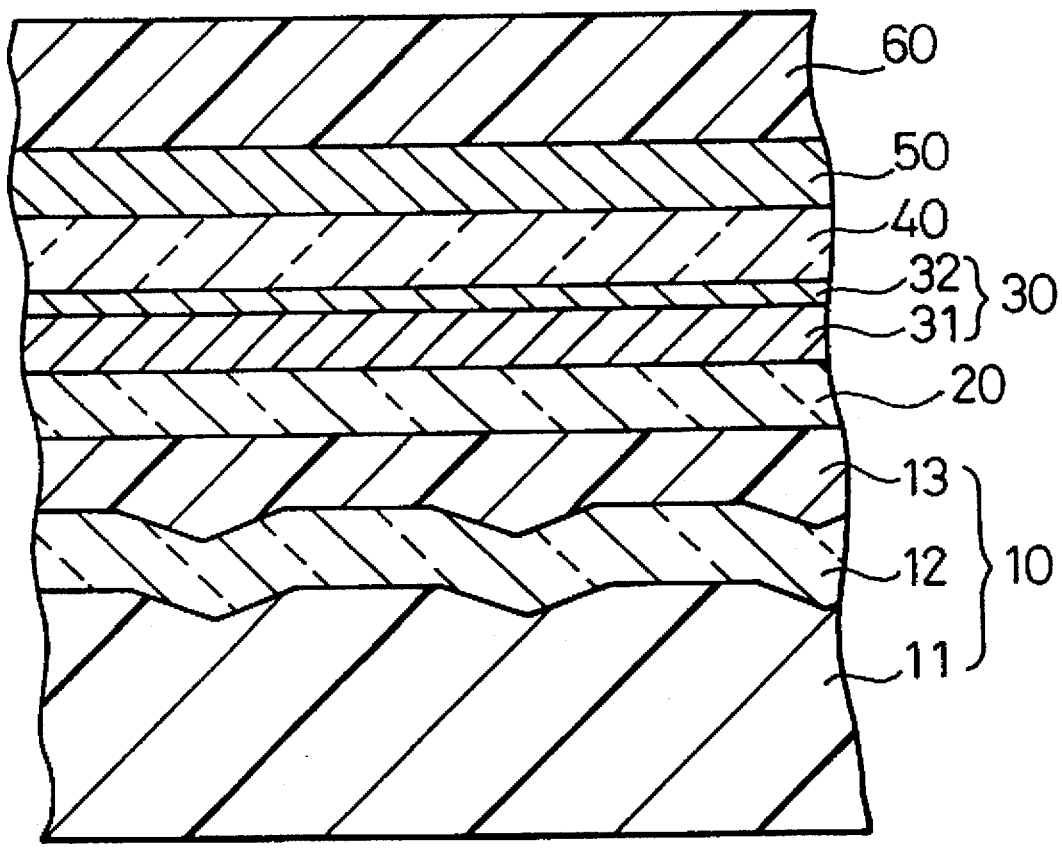
FIG. 5 is a sectional view of another magneto-optical recording medium used in the Examples.

Magneto-optical recording media as shown in FIG. 5 were prepared and evaluated. In FIG. 5, 10 denotes a substrate comprising a base 11, a guide-covering dielectric layer 12 on the base 11, and a leveling layer 13, 20 denotes a first dielectric layer, 30 a denotes recording layer comprising a first magnetic layer 31 and a second magnetic layer 32, 40 denotes a second dielectric layer, 50 denotes a metal reflecting layer and 60 denotes a protecting layer.

A polycarbonate resin (PC) base 11 was prepared which had a diameter of 130 mm, a thickness of 1.2 mm, and spiral grooves with a pitch of 1.6 μm and a depth of 70 nm.

The guide-covering dielectric layer 12 was first deposited on the base 11 in the manner as described below. That is, the base 11 was set in a vacuum chamber of a three target radio frequency magnetron sputtering apparatus (ANELVA SPF-430H) and the vacuum chamber was evacuated to 53 μPa. The substrate 1 was rotated at 15 rpm during deposition. The target used was a sintered disc of AlSi (50:50) with a diameter of 100 mm and a thickness of 5 mm. An Ar/$N_2$ mixed gas (30 vol %-$N_2$) was introduced into the vacuum chamber and the flow rate was adjusted to obtain a pressure of 0.4 Pa. Radio frequency sputtering was conducted at a discharge power of 400 W and a discharge frequency of 13.56 MHz to deposit an 80 nm thick AlSiN layer as the guide-covering dielectric layer 12. The sample was taken out from the sputtering apparatus.

The leveling layer 13 was formed on the guide-covering layer 12. The disc sample or base 11 was set on a spin-coater. An ultra-violet curing phenol novolak epoxy acrylate resin was coated onto the disc while the disc rotated at 3000 rpm and the disc was transferred through an ultra-violet irradiation apparatus to cure the resin, to thereby form a leveling layer 13 with a thickness of about 150 nm. The coating solution used had a viscosity of 40 cP at 20° C. and contained a diluent of butyl alcohol.

The sample or substrate 11 was thus prepared and the first dielectric layer 20 was formed thereon as below. The sample was again set in the vacuum chamber of a three target radio frequency magnetron sputtering apparatus (ANELVA SPF-430H) and the vacuum chamber was evacuated to 53 μPa. The substrate 1 was rotated at 15 rpm during deposition.

The target used was a sintered disc of AlSi (50:50) with a diameter of 100 mm and a thickness of 5 mm. An Ar/$N_2$ mixed gas (30 vol %-$N_2$) was introduced into the vacuum chamber and the flow rate was adjusted to obtain a pressure of 0.4 Pa. Radio frequency sputtering was conducted with a discharge power of 400 W and a discharge frequency of 13.56 MHz to deposit a 110 nm thick AlSiN layer as the first dielectric layer 20.

The first magnetic layer 31 was then deposited on the first dielectric layer 20. The target was changed to a sintered GdTbFeCo disc, the sputtering gas was pure Ar (99.999% purity), the gas pressure was 0.67 Pa and the discharge power was 200 W. DC sputtering was thus conducted to deposit the first magnetic layer 31 of a rare-earth transition-metal alloy of $(Gd_{25}Tb_{75})_{24}(Fe_{90}Co_{10})_{76}$ with a thickness of 110 nm.

The second magnetic layer 32 was then deposited on the first magnetic layer 31. The target was changed to a composite target of a Pt disc with Co chips thereon (10×10×1 mm), the sputtering gas was pure Ar (99.999% purity), the gas pressure was 0.67 Pa and the discharge power was 100 W. DC sputtering was conducted to deposit the second magnetic layer 40 of a $Pt_{80}Co_{20}$ alloy. The thickness of the alloy layer 40 was varied for Examples 31 to 37.

The second dielectric layer 40 was then deposited on the second magnetic layer 32. The target and the sputtering gas were the sintered AlSi disc and the Ar/$N_2$ mixed gas as used above and sputtering was conducted under the same conditions as for the first dielectric layer 20 to deposit an AlSiN layer 40 with a thickness of 45 nm.

The metal reflecting layer 50 was then deposited on the second dielectric layer 40. The target was changed to an AlAuTi alloy target, the sputtering gas was pure Ar (99.999% purity), the gas pressure was 0.67 Pa and the discharge power was 100 W. DC sputtering was thus conducted to deposit an $Al_{92}Au_5Ti_3$ alloy layer with a thickness of 60 nm.

The thus prepared sample was taken out of the sputtering apparatus and set on a spin-coater. A ultra-violet curing phenol novolak epoxy acrylate resin was coated on the disc while the disc was rotated at 3000 rpm and the disc was then transferred through a ultra-violet irradiation apparatus to cure the resin and to thereby form an organic resin protecting layer 60. The thickness of the resin was about 20 μm and the coating solution had a viscosity of about 500 cP with a diluent of butyl alcohol.

Thus, magneto-optical recording media having the constitution as shown in FIG. 3 were obtained.

In Comparative example 6, a magneto-optical recording medium was prepared in the same manner as in Examples 31 to 37 except that the second magnetic layer 32 was not formed. In Comparative example 7, a magneto-optical recording medium was prepared in the same manner as in Examples 31 to 37 except that the second magnetic layer 32 and the guide-covering dielectric layer 12 were not formed. In Comparative example 8, a magneto-optical recording medium was prepared in the same manner as in Examples 31 to 37 except that the second magnetic layer 32, the guide-covering dielectric layer 12 and the leveling layer 13 were not formed.

Figure 6:
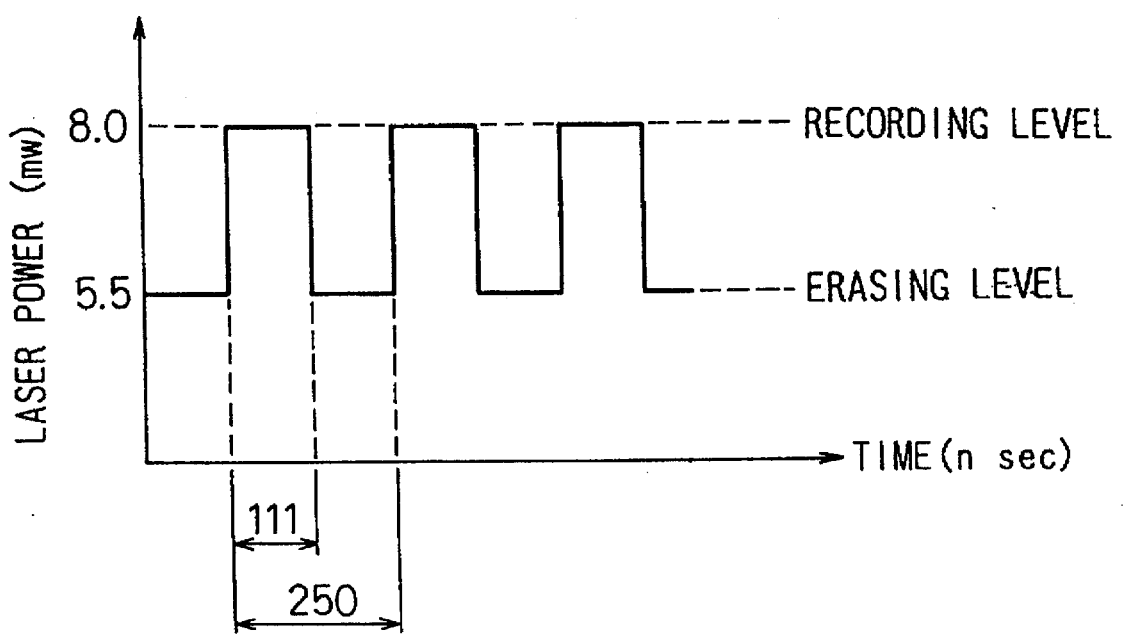
FIGS. 6 and 7 show the waveforms of other optical pulses used for overwriting.
Figure 7:
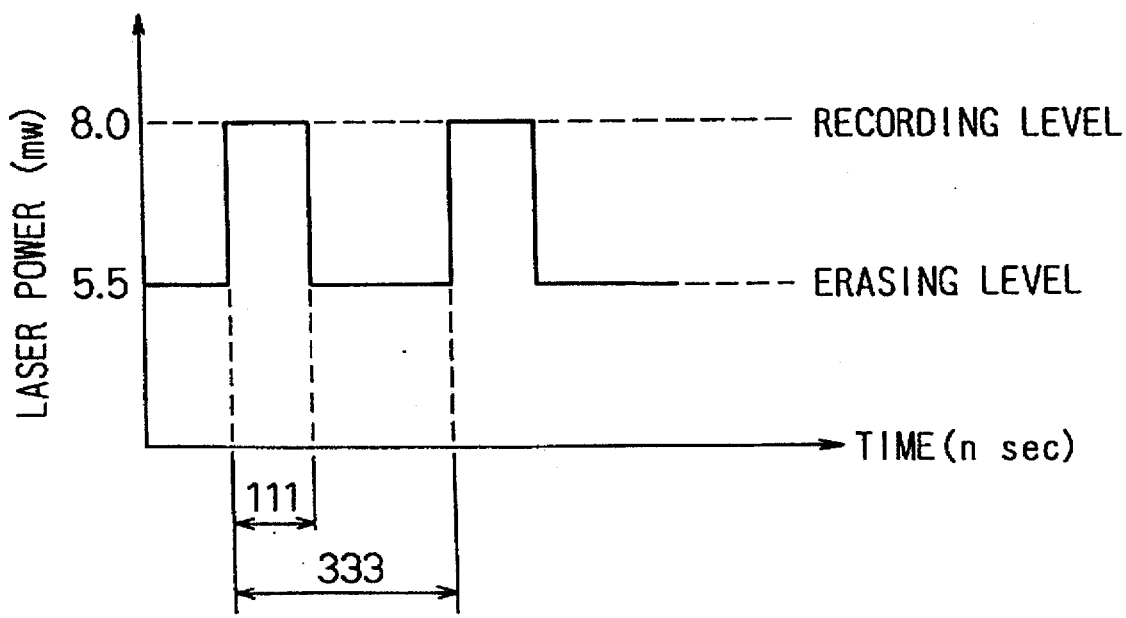

The C/N ratios of these media after overwriting were then measured. A direct overwriting was conducted by applying optical pulses as shown in FIGS. 6 and 7 to the disc on a point 30 mm from the center while rotating the disc at 3600 rpm (linear speed was 11.3 m/sec) and applying a bias magnetic field of 350 Oe in the direction of bit recording. In FIG. 6, the level and duration of the laser power were 8.0 mW and 111 nanoseconds for recording and 5.5 mW and 139 nanoseconds for erasing. In FIG. 7, the level and duration of the laser power were 8.0 mW and 111 nanoseconds for recording and 5.5 mW and 222 nanoseconds for erasing. After the overwritting, the reproduction signal from the overwritten samples was measured by applying a 1.0 mW continuous beam to determine the C/N ratio of the reproduced signal.

As a result, servo tracking was stable in Examples 31 to 37 and in Comparative examples 6 and 38 In contrast, a servo tracking was not possible and, therefore, measurement of C/N ratio was impossible, in Comparative examples 7.

The measured C/N ratios are shown in Table 2.

TABLE 2

| Sample | Thickness of $Pt_{80}Co_{20}$ alloy layer (nm) | C/N (dB) |
| --- | --- | --- |
| Ex. 31 | 1.0 | 45 |
| Ex. 32 | 1.5 | 46 |
| Ex. 33 | 2.0 | 47 |
| Ex. 34 | 3.0 | 47 |
| Ex. 35 | 4.0 | 46 |
| Ex. 36 | 5.0 | 45 |
| Ex. 37 | 10.0 | 43 |
| Com. ex. 6 | 0 | 41 |
| Com. ex. 7 | 0 | — |
| Com. ex. 8 | 0 | 38 |

Examples 38–52 and Reference Examples 1–12

Here, it should be noted that Examples 38 to 52 are within the third aspect of the present invention and Reference examples 1 to 12 are outside of the third aspect of the present invention but Reference examples. 1 to 12 are not necessarily outside of the present invention. Reference examples can be within the first aspect of the present invention.

Magneto-optical recording media as shown in FIG. 3 were prepared and evaluated. In FIG. 3 1 denotes a substrate having guides on the surface thereof, 2 a first dielectric layer, 3 a recording layer comprising a first magnetic layer 3-1 and a second magnetic layer 3-2, 4 a second dielectric layer, 5 a metal reflecting layer and 6 a protecting layer.

A polycarbonate resin (PC) substrate 1 having a diameter of 130 mm and a thickness of 1.2 mm and having spiral grooves with a pitch of 1.6 μm was set in a vacuum chamber of a three target radio frequency magnetron sputtering apparatus (ANELVA SPF-430H) and the vacuum chamber was evacuated to 53 μPa. The substrate 1 was rotated at 15 rpm during deposition.

An AlSiN layer was first deposited as the first dielectric layer 2 on the substrate 1. The target used was a sintered disc of AlSi (50:50) with a diameter of 100 mm and a thickness of 5 mm. An Ar/$N_2$ mixed gas (30 vol %-$N_2$) was introduced into the vacuum chamber and the flow rate was adjusted to obtain a pressure of 0.4 Pa. Radio frequency sputtering was conducted at a discharge power of 400 W and a discharge frequency of 13.56 MHz to deposit a 110 nm thick AlSiN layer as the first dielectric layer 2.

The first magnetic layer 3-1 was then deposited on the first dielectric layer 2. The target was changed to a sintered disc of each of $Gd_6Tb_{20}Fe_{66}Co_8$, $Gd_6Tb_{20}Fe_{71}Co_3$, $Gd_6Tb_{20}Fe_{73}Co_1$, $Gd_6Tb_{20}Fe_{74}$ and $Tb_{26}Fe_{74}$ alloys, the sputtering gas was pure Ar (99.999% purity), the gas pressure was 0.67 Pa and the discharge power was 100 W. DC sputtering was conducted to deposit the first magnetic layer 3-1 made of $Gd_6Tb_{20}Fe_{66}Co_8$ (Tcw=240° C.), $Gd_6Tb_{20}Fe_{71}Co_3$ (Tcw=180° C.), $Gd_6Tb_{20}Fe_{73}Co_1$ (Tcw=150° C.), $Gd_6Tb_{20}Fe_{74}$ (Tcw=120° C.) or $Tb_{26}Fe_{74}$ (Tcw=80° C.) to a thickness of 20 nm.

Here, samples having a first magnetic layer 3-1 of $Gd_6Tb_{20}Fe_{71}Co_3$ with Tcw=180° C. are referred to as Examples 38 to 41 and Reference examples 6 and 7; samples having a first magnetic layer 3-1 of $Gd_6Tb_{20}Fe_{66}Co_8$ with Tcw=240° C. are referred to as Reference examples 1 to 5; samples having a first magnetic layer 3-1 of $Gd_6Tb_{20}Fe_{73}Co_1$ with Tcw=150° C. are referred to as Examples 42 to 46 and Reference examples 8 and 9; samples having a first magnetic layer 3-1 of $Gd_6Tb_{20}Fe_{74}$ with Tcw=120° C. are referred to as Examples 47 to 51 and Reference examples 10 and 11; and a sample having a first magnetic layer 3-1 of $Tb_{26}Fe_{74}$ with Tcw=80° C. is referred to as Reference example 12.

The second magnetic layer 3-2 was then deposited on the first magnetic layer 3-1. The target was changed to a composite target of a Pt disc with Co chips (5×5 mm) thereon, the sputtering conditions were the same as those for the first magnetic layer 3-1.

The second dielectric layer 5 was then deposited on the second magnetic layer 3-2. The target and the sputtering gas were the sintered AlSi disc and the Ar/$N_2$ mixed gas used above and sputtering was conducted, under the same conditions as for the first dielectric layer 2, to deposit an AlSiN layer 4 with a thickness of 45 nm.

The metal reflecting layer 5 was finally deposited on the second dielectric layer 4. The target was changed to an $Al_{91}Au_7Ti_2$ or $Ag_{93}Au_5Ti_2$ alloy target, the sputtering conditions were the same as those for the first magnetic layer 3-1 to deposit an $Al_{91}Au_7Ti_2$ or $Ag_{93}Au_5Ti_2$ alloy layer. The thickness of the respective samples are shown in Table 3.

The thus prepared sample was taken out from the sputtering apparatus and set on a spin-coater. An ultra-violet curing phenol novolak epoxy acrylate resin was coated on the disc while the disc rotated at 3000 rpm and the disc was transferred through an ultra-violet irradiation apparatus to cure the resin, to thereby form an organic resin protecting layer 6. The thickness of the resin was about 20 μm and the coating solution had a viscosity of 500 cP with a diluent of butyl alcohol.

Thus, magneto-optical recording media having the constitution as shown in FIG. 3 were obtained.

Figure 8:
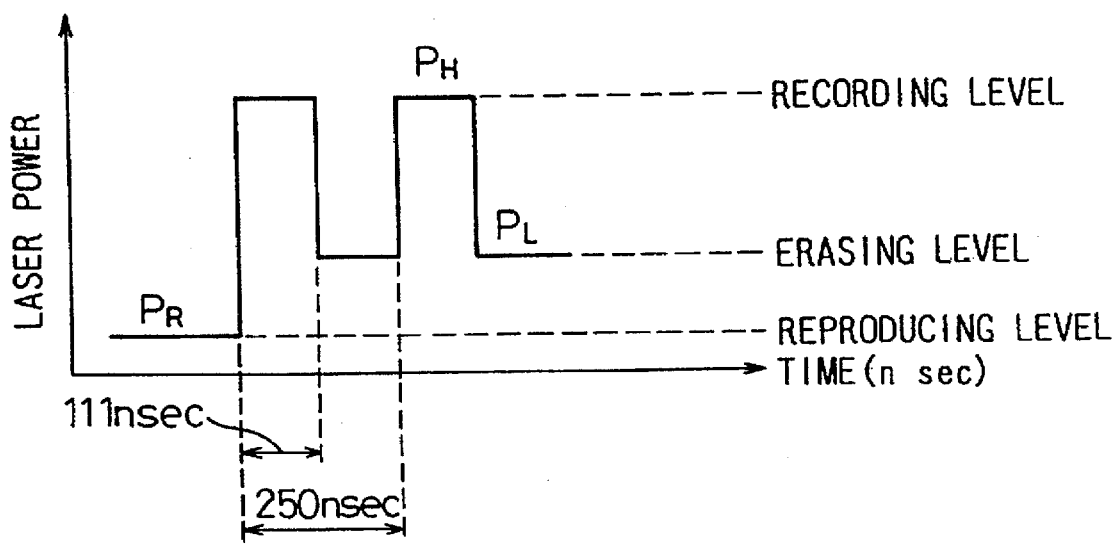
FIGS. 8 and 9 show the waveforms of other optical pulses used for overwriting.
Figure 9:
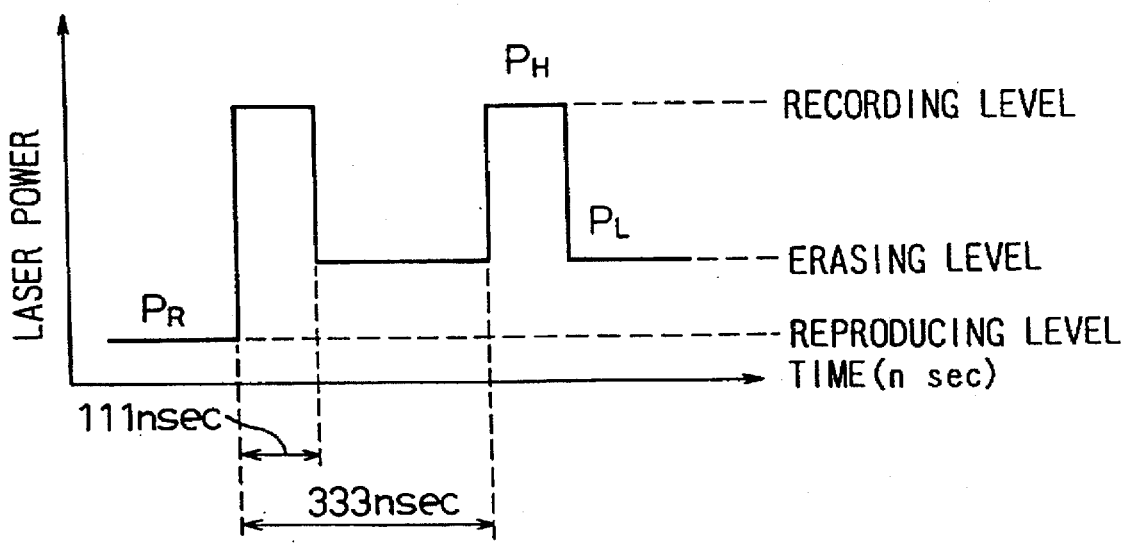

The C/N ratios of these media after overwriting were measured using a magneto-optical recording and reproducing apparatus (Pultex Kogyo DDU-1000 type). Direct overwriting was conducted by applying optical pulses as shown in FIGS. 7 and 8 to the disc at a point 30 mm from the center while the disc rotated at 3600 rpm (linear speed was 11.3 m/sec) and applying a bias magnetic field of 350 Oe in the direction of bit recording. In FIG. 7, the level and duration of the laser power was PH (mW) and 111 nanoseconds for recording and PL=5.5 mW and 139 nanoseconds for erasing. In FIG. 8, the level and duration of the laser power were PH(mW) and 111 nanoseconds for recording and 5.5 mW and 222 nanoseconds for erasing. Note that PH was varied in steps of 0.5 mW. After the overwriting, the reproduction signal from the overwritten samples was measured by applying a continuous beam with PR=1.0 mW to determine the C/N ratio of the reproduced signal.

The thus obtained C/N ratios are shown in the table in FIG. 10, in which the data for each sample comprise the sample indication in the above line and the C/N in dB and the overwriting laser power level PH in mW in the lower line. For example, the table in FIG. 10 shows that in Example 38, the first magnetic layer 3-1 was made of $Gd_6Tb_{20}Fe_{71}Co_3$ alloy with Tcw=180° C. and the metal reflecting layer 50 was made of $Al_{91}Au_7Ti_2$ with a thickness of 120 nm and λd=2.5 μW/K. In this example, PH=8.5 mW provided a peak C/N ratio of 40 dB.

Figure 11:
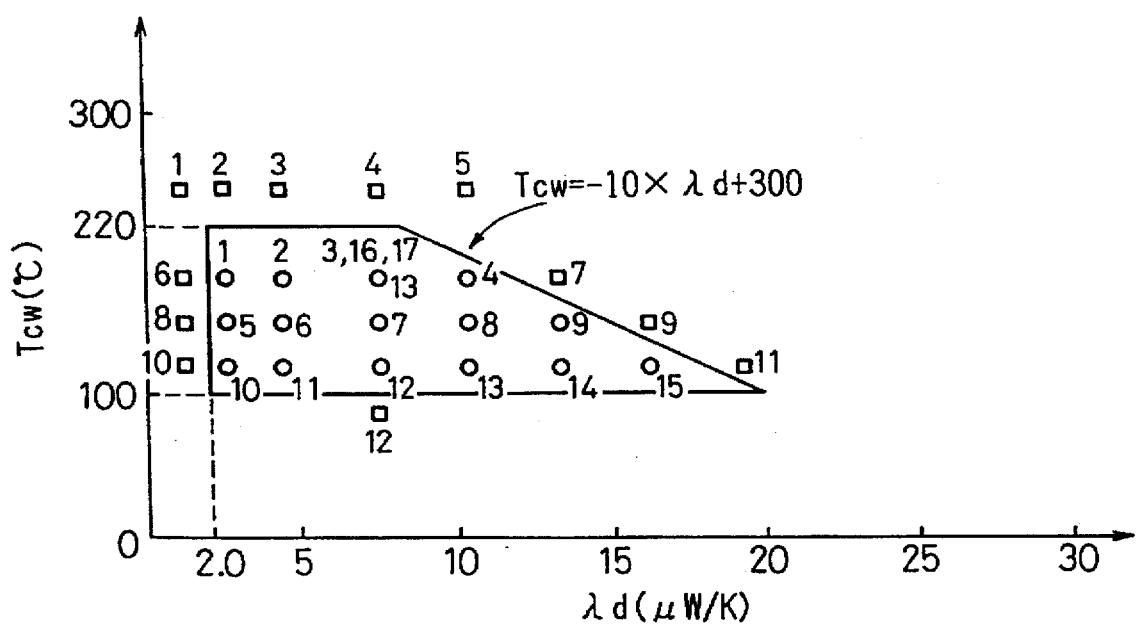
FIG. 11 shows the relationships between Examples 31 to 52 and Reference examples 1 to 12.

FIG. 11 shows the relationships between Examples and Reference examples. In FIG. 11, the abscissa represents the product λd (μW/K), the ordinate represents the Curie temperature Tcw of the first magnetic layer, ○ stands for an Example, □ stands for Reference example, and the number accompanying an ○ or a □ represents the number of the Example or the Reference example. The solid line shows the boundary of the third aspect of the present invention.

It is demonstrated in FIGS. 10 and 11 that in accordance with the third aspect of the present invention, the C/N ratio of a magneto-optical recording layer after overwriting with a modification of the power level and the pulse width of the optical pulses, but without a change in the direction of the bias magnetic field, can be significantly improved.

The magnetic field to be applied for obtaining the maximum C/N ratio was also determined and it was confirmed that 150 Oe was optimum for both Examples 38 to 52 and Reference examples 1 to 12.

Example 53

A magneto-optical recording medium was prepared in the same manner as in Example 40 except that the substrate used was as below.

A polycarbonate resin (PC) base 11 having a diameter of 130 mm and a thickness of 1.2 mm and having spiral grooves with a pitch of 1.6 μm was prepared. The base was set in the vacuum chamber of a three target radio frequency magnetron sputtering apparatus (ANELVA SPF-430H) and the vacuum chamber was evacuated to 53 μPa. The substrate 1 rotated at 15 rpm during deposition. The target used was a sintered disc of AlSi (50:50) with a diameter of 100 mm and a thickness of 5 mm. An $Ar/N_2$ mixed gas (30 vol %-$N_2$) was introduced into the vacuum chamber and the flow rate was adjusted to obtain a pressure of 0.4 Pa. Radio frequency sputtering was conducted, with a discharge power of 400 W and a discharge frequency of 13.56 MHz, to deposit an 80 nm thick AlSiN layer as a guide-covering layer.

A leveling layer 13 was formed on the guide-covering layer. The base was set on a spin-coater. An ultra-violet curing phenol novolak epoxy acrylate resin was coated on the disc while the disc rotated at 3000 rpm and the disc was transferred through an ultra-violet irradiation apparatus to cure the resin, to thereby form a leveling layer. The coating solution had a viscosity of 40 cP at 20° C. with a diluent of butyl alcohol. The leveling layer had a thickness of about 150 nm in a region other than over the guides.

This substrate was used and other layers were deposited or formed in the same manner as in Example 40 to obtain a magneto-optical recording medium as shown in FIG. 3.

The medium was evaluated in the same manner as in Example 40. The C/N ratio was 45 dB at PH=9.5 mW. The optimum applied magnetic field at which a maximum C/N ratio was obtained was 150 Oe.

Example 54

A magneto-optical recording medium as shown in FIG. 3 was prepared in the same manner as in Example 40 except that the substrate used was a substrate for a sample servo system using wobble bits.

The evaluation of the medium was conducted in the same manner as in Example 40. The C/N ratio was 45 dB at PH=9.5 mW. The optimum applied magnetic field at which a maximum C/N ratio was obtained was 150 Oe.

Comparative Example 9

A magneto-optical recording medium was prepared in the same manner as in Example 40 except that the second magnetic layer was not formed.

The evaluation of the medium was conducted in the same manner as in Example 40. The C/N ratio was 38 dB at PH=9.5 mW. The optimum applied magnetic field at which a maximum C/N ratio was obtained was 350 Oe.

We claim:

1. A magneto-optical recording medium for direct overwriting which comprises modifying at least one of a power level and pulse width of applied optical pulses without changing the direction of the bias magnetic field, said medium comprising a first dielectric layer, a recording layer, a second dielectric layer, and a metal reflecting layer in this order over a transparent substrate, wherein said recording layer is composed of a first magnetic layer and a second magnetic layer, wherein said first magnetic layer comprises a rare-earth transition-metal amorphous alloy and has a perpendicular easy magnetization axis, wherein said first magnetic layer has a thickness of 10 to 200 nm and has a compensation temperature above room temperature, wherein said second magnetic layer comprises a first component made of an alloy of at least one of Co and Fe and a second component made of (i) at least one of a rare earth metal and a noble metal or (ii) an alloy of Co and at least one metal selected from the group consisting of Ti, Cr, Mn, Cu, Zn, Ga and Ge; wherein said second magnetic layer has an in-plane easy magnetization axis parallel to the second magnetic layer when formed separately on a dielectric layer, and wherein said second magnetic layer has a thickness of not more than 3 nm.

2. A medium according to claim 1, wherein said second magnetic layer is formed on said first magnetic layer, and wherein said first magnetic layer has a magnetization perpendicular to the plane of the second magnetic layer.

3. A medium according to claim 1, wherein said second magnetic layer has a saturation magnetization of not more than 400 emu/cc.

4. A medium according to claim 3, wherein said second magnetic layer has a saturation magnetization of not more than 300 emu/cc.

5. A medium according to claim 1, wherein said first magnetic layer has a thickness of not more than 30 nm.

6. A medium according to claim 1, wherein said first magnetic layer is a GdTbFeCo alloy layer.

7. A medium according to claim 1, wherein said substrate further comprises a base, a third dielectric layer and a leveling layer in this order, said base having a surface on which guides for optical tracking servo in the form of concave and convex guides are formed adjacent to regions for data storage, said base being made of an organic resin at least in a portion where said guides are formed, said third dielectric layer being formed on said base at least in areas where said guides are formed, said leveling layer being formed over said third dielectric layer, said third dielectric layer having a refractive index higher than that of the portion of said base where said guides are formed and of said leveling layer.

8. A medium according to claim 7, wherein said base as a whole is made of a polycarbonate resin.

9. A medium according to claim 7, wherein said guides have a depth of not less than 40 nm.

10. A medium according to claim 9, wherein said guides have a depth of not less than 70 nm.

11. A medium according to claim 7, wherein said third dielectric layer has a refractive index of not less than 1.6 for a wavelength of a tracking servo beam.

12. A medium according to claim 11, wherein said third dielectric layer has a refractive index of not less than 1.8 for a wavelength of a tracking servo beam.

13. A medium according to claim 7, wherein said third dielectric layer is AlSiN.

14. A medium according to claim 7, wherein said leveling layer is of a cured resin.

15. A medium according to claim 7, wherein said leveling layer has a thickness of 50 to 500 nm in regions over said guides.

16. A medium according to claim 7, wherein said second magnetic layer is a $Pt_{100-x}Co_x$ alloy, wherein $10 \leq x \leq 60$.

17. A medium according to claim 1, wherein said first magnetic layer is a magneto-optical recording layer, said second magnetic layer has an in-plane easy magnetization axis, said first magnetic layer has a Curie temperature Tcw (°C.), a compensation temperature Tcom (°C.) and a thickness t (nm), said second magnetic layer has a Curie temperature Tci (°C.), and said metal reflecting layer has a thickness d (nm) and a product $\lambda d$ (μW/K) of a thermal conductivity $\lambda$ multiplied by a thickness d, where μ is $10^6$, W is Watt, and K is the absolute temperature, wherein 100° C.$\leq$Tcw$\leq$220° C.;
room temperature$\leq$Tcom$\leq$Tcw;
15 nm$\leq$t$\leq$60 nm;
Tcom$\leq$Tci$\leq$Tcw+100° C.;
d$\geq$40 nm;
$2.0 \leq \lambda d \leq 20$; and
Tcw$\leq$$-10 \times \lambda d + 300$.

18. A medium according to claim 17, wherein said first magnetic layer has a Curie temperature Tcw (°C.) of $150 \leq t \leq 200$.

19. A medium according to claim 17, wherein said first magnetic layer is a GdTbFeCo alloy layer.

20. A medium according to claim 17, wherein said second magnetic layer is a PtCo alloy layer.

21. A medium according to claim 17, wherein said metal reflecting layer is an alloy containing at least AlAu or AgAu.

22. A medium according to claim 17, wherein said first dielectric layer is formed on a planar substrate.

23. A medium according to claim 22, wherein said substrate, comprising a base, a third dielectric layer and a leveling layer in this order, has a surface on which guides, for an optical tracking servo, in the form of concave and convex guides are formed adjacent to regions for data storage, said base being made of an organic resin at least in a portion where said guides are formed, said third dielectric layer being formed on said base at least in areas where said guides are formed, said leveling layer being formed over said third dielectric layer, said third dielectric layer having a refractive index higher than that of the portion of said base where said guides are formed and of said leveling layer.

* * * * *